United States Patent
Bakalash

(10) Patent No.: US 9,483,865 B2
(45) Date of Patent: Nov. 1, 2016

(54) RAY SHOOTING METHOD UTILIZING GEOMETRICAL STENCILS

(71) Applicant: Reuven Bakalash, Shdema (IL)

(72) Inventor: Reuven Bakalash, Shdema (IL)

(73) Assignee: ADSHIR LTD., Shdema (IL)

( * ) Notice: Subject to any disclaimer, the term of this patent is extended or adjusted under 35 U.S.C. 154(b) by 0 days.

(21) Appl. No.: 14/479,322

(22) Filed: Sep. 7, 2014

(65) Prior Publication Data

US 2014/0375641 A1  Dec. 25, 2014

Related U.S. Application Data

(63) Continuation-in-part of application No. 13/726,763, filed on Dec. 26, 2012.

(60) Provisional application No. 61/894,005, filed on Oct. 22, 2013.

(51) Int. Cl.
*G06T 15/06* (2011.01)
*G06T 15/20* (2011.01)
*G06F 9/50* (2006.01)
*G06T 15/80* (2011.01)

(52) U.S. Cl.
CPC .............. *G06T 15/06* (2013.01); *G06F 9/5061* (2013.01); *G06T 15/205* (2013.01); *G06T 15/80* (2013.01); *G06F 2209/502* (2013.01); *G06T 2210/52* (2013.01)

(58) Field of Classification Search
CPC ........ G06T 15/06; G06T 15/55; G06T 15/60
See application file for complete search history.

(56) References Cited

U.S. PATENT DOCUMENTS

| | | | |
|---|---|---|---|
| 2007/0257911 A1* | 11/2007 | Bavoil et al. | 345/426 |
| 2008/0088622 A1* | 4/2008 | Shearer | 345/421 |
| 2008/0100617 A1* | 5/2008 | Keller et al. | 345/421 |
| 2009/0102844 A1* | 4/2009 | Deparis | 345/426 |

OTHER PUBLICATIONS

Wyman, Chris. "Voxelized shadow volumes." Proceedings of the ACM SIGGRAPH Symposium on High Performance Graphics. ACM, 2011.*

* cited by examiner

*Primary Examiner* — Daniel Hajnik

(57) ABSTRACT

Aspects comprise a ray shooting method based on the data structure of a uniform grid of cells, and on local stencils in cells. The high traversal and construction costs of accelerating structures are cut down. The object's visibility from the viewpoint and from light sources, as well as the primary workload and its distribution among cells, are gained in the preprocessing stage and cached in stencils for runtime use. In runtime, the use of stencils allows a complete locality at each cell, for load balanced parallel processing.

10 Claims, 37 Drawing Sheets

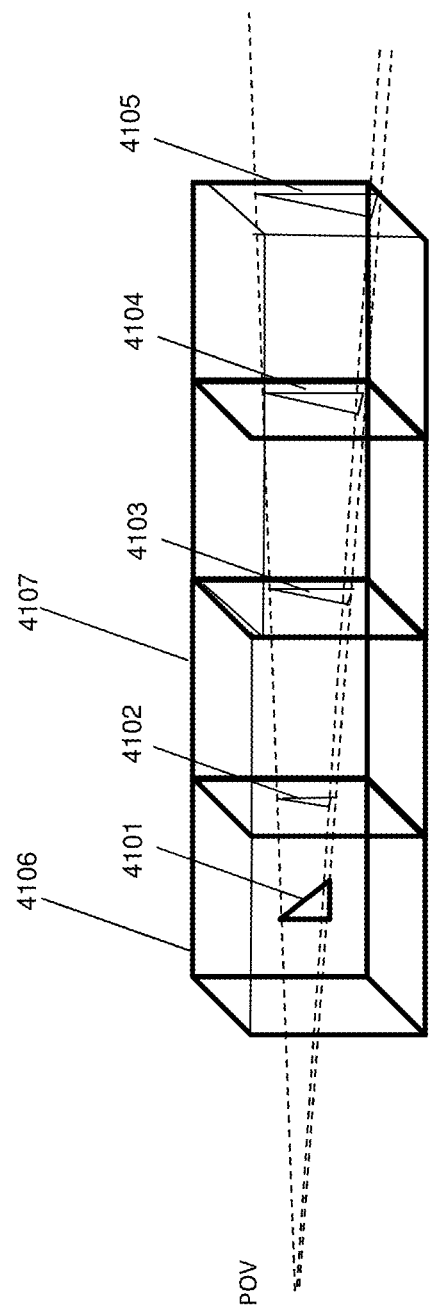

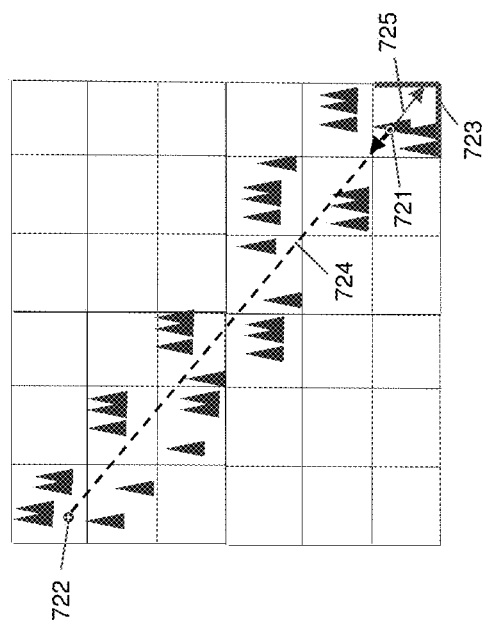

RAY SHOOTING METHOD UTILIZING GEOMETRICAL STENCILS

CROSS-REFERENCE TO RELATED CASES

The present application claims priority based on U.S. Provisional Application No. 61/894,005 filed Oct. 22, 2013 entitled "System for Primary Ray Shooting Having Geometrical Stencils"; and is a Continuation-In-Part of the U.S. application Ser. No. 13/726,763 filed Dec. 26, 2012 entitled "Method and Apparatus for Interprocessor Communication Employing Modular Space Division"; all of which are hereby incorporated by reference.

FIELD OF THE INVENTION

The present invention relates generally to solving data-parallel processing and, more particularly, to data-parallel ray tracing technology enabling real time applications and highly photo-realistic images.

BACKGROUND OF THE INVENTION

Ray-tracing is a technique for generating images by simulating the behavior of light within a three-dimensional scene by typically tracing light rays from the camera into the scene, as depicted in FIG. 1. In general two types of rays are used. The ray that comes from the screen or viewer's eye (aka point of view) is called the primary ray. Tracing and processing the primary ray is called primary ray shooting, or just ray shooting. If the primary ray hits an object, at the primary point of intersection, the light may bounce from the surface of the object. We call these rays secondary rays. Primary rays are traced from a particular point on the camera image plane (a pixel) into the scene, until they hit a surface, at a so-called hit or primary intersection point. Shadow rays and secondary rays are traced from a hit point to determine how it is lit. The origin of a shadow ray is on the surface of an object and it is directed towards the light sources. If the ray hits any object before it reaches any light source, the point located at the ray origin is in the shadow and should be assigned a dark color. Processing the shadow ray is called shadowing. Finally, to determine how the surface material appears texture lookups and shading computations are performed at or near the hit point. FIG. 2 shows a scene having three objects and a single light source. Three ray generations are created when the primary ray spawns other rays (N' surface normal, R' reflected ray, L' shadow ray, T' transmitted (refracted) ray).

Ray tracing is a high computationally expensive algorithm. Fortunately, ray tracing is quite easy to parallelize. The contribution of each ray to the final image can be computed independently from the other rays. For this reason, there has been a lot of effort put into finding the best parallel decomposition for ray tracing. There are two main approaches in prior art to the parallel ray-tracing: (i) ray-parallel, in which rays are distributed among parallel processors, while each processor traces a ray all the way, and (ii) data-parallel, in which the scene is distributed among multiple processors, while a ray is handled by multiple processors in a row.

The ray-parallel implementation of ray tracing would simply replicate all the data with each processor and subdivide the screen into a number of disjunct regions. Each processor then renders a number of regions using the unaltered sequential version of the ray tracing algorithm, until the whole image is completed. Whenever a processor finishes a region, it asks the master processor for a new task. This is also called the demand driven approach, or an image space subdivision. Load balancing is achieved dynamically by sending new tasks to processors that have just become idle. However, if a very large models need to be rendered, the scene data have to be distributed over the memories, because the local memory of each processor is not large enough to hold the entire scene. Then demand driven approach suffers from massive copies and multiplications of geometric data.

Data-parallel is a different approach to rendering scenes that do not fit into a single processor's memory. Here, the object data is distributed over the processors. Each processor owns only a subset of the database and it traces rays only when they pass through its own subspace. Its high data locality excludes massive moves of data, answering the needs of very large models. However, rendering cost per ray and the number of rays passing through each subset of database are likely to vary (e.g. hot spots are caused by viewpoints and light sources), leading to severe load imbalances, a problem which is difficult to solve either with static or dynamic load balancing schemes. Efficiency thus tends to be low in such systems.

In order to exploit locality between data accesses as much as possible, usually some spatial subdivision is used to decide which parts of the scene are stored with which processor. In its simplest form, the data is distributed according to a uniform distribution. Each processor will hold one or more equal sized voxels. Having just one voxel per processor allows the data decomposition to be nicely mapped onto a 3D grid topology. However, since the number of objects may vary dramatically from voxel to voxel, the cost of tracing a ray through each of these voxels will vary and therefore this approach may lead to severe load imbalances.

The way the data is distributed over processors has a strong impact on how well the system performs. The more even the workload associated with a particular data distribution, the less idle time is to be expected. Three main criteria need to be observed for such distributions to lead to efficient execution of the parallel algorithm (Salmon and Goldsmith): (i) The memory overhead for each processor should be as equal as possible. (ii) Communication requirements during rendering need to be minimized. (iii) Processing time for each processor needs to be equalized.

Generating data distributions which adhere to all three criteria is a difficult problem, which remains unsolved in prior art. Most data distributions are limited to equalizing the memory overhead for each processor. This is a relatively simple exercise, because generating an adaptive spatial subdivision, such as an octree or KD-tree, gives sufficient clues as to which regions of space contain how many objects.

Another problem in ray tracing is the high processing cost of acceleration structures. For each frame, a rendering system must find the intersection points between many rays and many polygons. The cost of testing each ray against each polygon is prohibitive, so such systems typically use accelerating structures (such as Octree, KD-tree, other binary trees, bounding boxes, etc.) to reduce the number of ray/polygon intersection tests that must be performed. As the data is sorted over space with the acceleration structure, the data distribution over the processors is based on this structure as well. The spatial subdivision is also used to establish which data needs to be fetched from other processors. Moreover, construction of optimized structures is expensive and does not allow for rebuilding the accelerating structure every frame to support for interactive ray-tracing of large dynamic scenes. The construction times for larger scenes are very high and do not allow dynamic changes.

There has been an attempt in prior art to lower the cost and complexity of acceleration structures by using its simplest form, where the data is distributed uniformly. Each processor will hold one or more equal sized voxels. Having just one voxel per processor allows the data decomposition to be nicely mapped onto a 3D grid topology. However, since the number of objects may vary dramatically from voxel to voxel, the cost of tracing a ray through each of these voxels will vary and therefore this approach leads to severe load imbalances, and consequently the uniform distribution has been abandoned.

Today, the most popular data structure in prior art is the KD-tree. Ray traversal in a KD-tree is particularly efficient for scenes with non-uniform distribution of objects. The massive traversal of accelerating structure based on KD-tree typically consumes major chunk of the frame time. The ray-object intersection tests of prior art are considered as the heaviest part of ray tracing due to extensive traversal across the accelerating data structures and massive memory access. Thus, there is a great need in the art to devise a method of improved load balancing, reduced traversals leaned on simple data structure, and reduced amount of intersection tests.

SUMMARY

In our stencil based ray tracing we use data structure based on a uniform grid of cells and stencils, enabling efficient tracing of rays and cut down the high traversal and construction costs of the prior art accelerating structures. The stencil based ray tracing comprises two distinct parts: preprocessing and runtime, while the runtime further breaks down to primary and secondary stages. Stencils, that are generated in the preprocessing stage acquire and cache critical data for the subsequent runtime processing. For each primary rendering ray the accurate cell along the ray where the intersection with an object occurs is pinned down, meaning that rays that do not hit objects are not tested for intersections. The visibility information on local objects, from the viewpoint as well as from all light sources, is gained in the preprocessing stage. E.g. data filled cells with no visible objects in the primary stage are not processed for shooting nor for shadowing. Another important information gained during preprocessing is the amount of primary workload at each cell and distribution of these workloads among cells. Based on this information an enhanced load balance is achieved. In runtime, the use of stencils allows a complete processing and data locality at each cell. In the primary stage this is a static locality enabling a completely local processing in a cell, without communication and synchronization. In primary stage each ray is break down into segments, each segment belongs to a different cell along the ray's path. At each cell only the ray segments that hit the stencil are generated and tested for intersection, when all the ray-object intersection tests are local. At each ray at most one segment is tested for intersection, exactly the one that locates the intersection. Rays that do not intersect are not tested at all. The parallel processing is balanced statically among evenly loaded modules of cells. The transition to secondary stage is smooth, eliminating processor idle times. The shadow stencils are in use for the secondary stage as well. There is processing locality in the secondary stage, but no data locality, i.e. secondary ray data must be transferred between neighboring cells. Therefore the parallel processing is done in a demand driven mode, featuring dynamic load balancing.

Our ray tracing method is efficiently mapped on off-the-shelf architectures, such as multicore CPU chips with or without integrated GPUs, or GPU chips having hundreds and more shaders, distributed memory parallel systems, shared memory parallel system, networks of discrete CPUs, PC-level computers, information server computers, cloud server computers, laptops, portable processing systems, tablets, smartphones, and essentially any computational-based machine. There is no need of special purpose hardware.

It is understood that embodiments of the present invention will become readily apparent to those skilled in the art from the following detailed description, wherein are shown and described only embodiments of the invention by way of illustration. As will be realized, the invention is capable of other and different embodiments and its several details are capable of modification in various other respects, all without departing from the scope defined by the claims. Accordingly, the drawings, examples and detailed description are to be regarded as illustrative in nature and not as restrictive.

The above summary is not exhaustive. The invention includes all systems and methods that can be practiced from all suitable combinations and derivatives of its various aspects summarized above, as well as those disclosed in the detailed description below and particularly pointed out in the claims filed with the application. Such combinations have particular advantages not specifically recited in the above summary.

BRIEF DESCRIPTION OF DRAWINGS

The invention is herein described, by way of non-limiting examples, with reference to the accompanying figures and drawings, wherein like designations denote like elements. Understanding that these drawings only provide information concerning typical embodiments and are not therefore to be considered limiting in scope:

FIG. 4A. An object viewed from a view point is projected on facets of successive cells. The projections are registered as stencils.

FIG. 7B. Shadowing process of a primary intersection point in regard to light source.

DETAILED DESCRIPTION OF THE INVENTION

Figure 1:
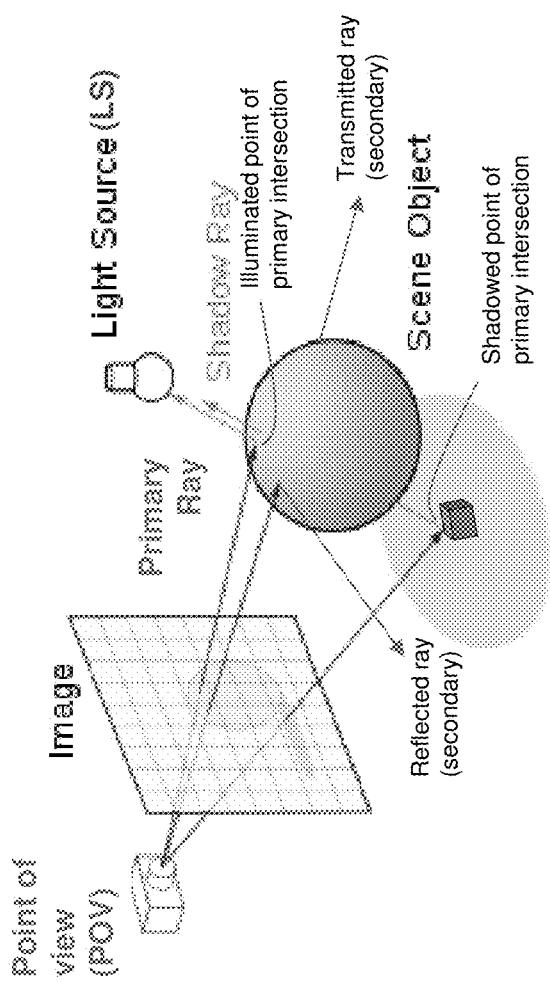
FIG. 1. Prior art. The figure illustrates a setup of a ray-traced scene including view point, image and scene object. Reflection, refraction, and shadow rays are spawned from a point of intersection between primary ray and scene object.

Unless specifically stated otherwise, as apparent from the following discussions, it is appreciated that throughout the specification discussions, utilizing terms such as "processing", "computing", "calculating", "generating", "creating" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as processor, computer, apparatus, system, sub-system, module, processing element (PE), multicore, GPU and device (in single or plural form) for performing the operations herein. This may be specially constructed for the desired purposes, or it may contain a general purpose computer selectively activated or reconfigured by a computer program stored in the computer. Several technical terms which are specifically associated with our ray tracing approach are herein defined. Uniform grid of cells—grid of cells when all cells in the grid are substantially of the same size and shape. Empty cell—is a cell without objects, as opposed to a data fill cell. Shooting rays—rays shot from the point of view and tracing the scene looking for a visible object. The hit points are termed points of primary intersection. Shadow (or shadowing) rays—rays between light source and points of primary intersections for testing whether the points are shadowed or litted. Local ray segments—a ray is subdivided to segments, each segment is local to a cell along the ray's path. Stencil—a projection of objects on cell's facets. Shooting stencil—stencil created by a projection from point of view. Shadow stencil—stencil created by a projection from light source. Polygon model is the way to represent object data such that the surfaces of objects are approximated with a mesh of polygons. Geometric model is the way to represent object data such that the surfaces of objects are defined analytically by procedural representation. External objects—objects that are outside a cell. Local objects—objects that are inside a cell. Visible object—is an object which is visible, at least in part, when looking from the point of view. It is not fully hidden by other objects. Primary intersection points—intersection points between tracing rays and objects resulting of the shooting phase. Shooting workload—working load due to runtime shooting process. Shadowing workload—working load due to runtime shadowing process. Load balancing—distributing workload across multiple processors to achieve optimal resource utilization, maximize throughput, minimize response time, and avoid overload. Shared memory system—parallel computing system having memory shared between all processing elements in a single address space. Distributed memory system—parallel computing system in which each processing element has its own local address space. Private memory—when in distributed memory systems the memory is also physically distributed, each processing element has its own private memory.

Figure 3A:
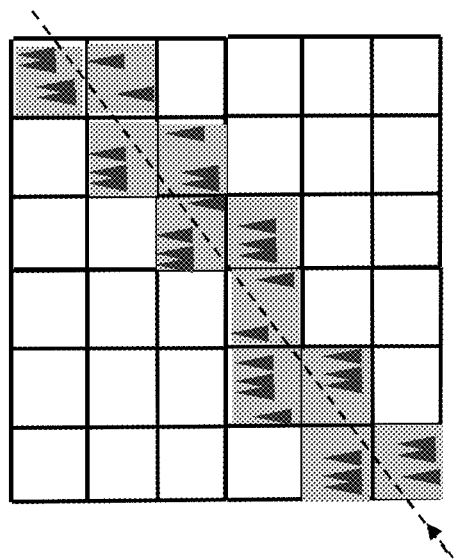
FIG. 3A. Prior art. Intersection tests for one ray passing the scene without hitting an object. The ray is tested for intersection in every single cell along its track. The number of tests in each cell equals to the number of objects.
Figure 3B:
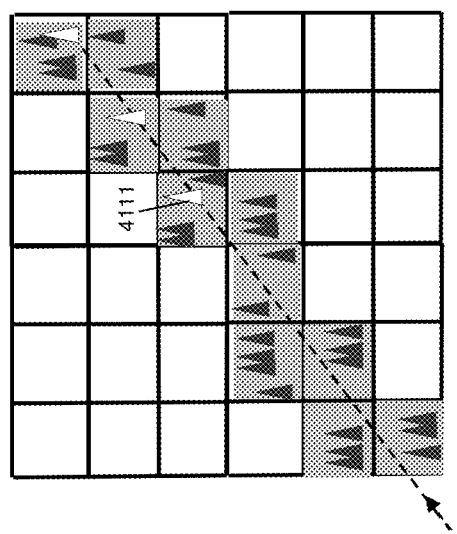
FIG. 3B. Prior art. A ray is tested for intersection in every single cell along its track, up to the first positive intersection. The number of tests in each cell equals to the number of objects.

The ray-object intersection tests of prior art are considered the heaviest part of ray tracing due to extensive traversal across the accelerating data structures and massive memory access. Ray that intersects an object at some point has performed many redundant intersection tests along its track, before the object is hit (FIG. 3B). A ray that does not hit any object across the scene is even more costly because of the multiple intersections along the way, all in vain (FIG. 3A). The processing complexity is of $O(N_{rays} * N_{objects})$, where $N_{objects}$ stands for all objects populating the cells along the ray's path, and $N_{rays}$ is the number of rays.

Moreover, the intersection tests are accompanied by a time-consuming ray traversal across accelerating data structures. In prior art various accelerating data structures (e.g. KD-tree, Octree) are in use. A data structure of the whole scene is usually being constructed during the preprocessing step, while in runtime the entire data structure is repeatedly traversed for each single ray, searching for the object hit by a given ray. Actually, tracing a single ray in within the sequence of successive cells along the ray's path is a big and complex task that must be repeatedly processed for each ray, out of millions of rays.

In contrast, we take a novel approach of providing at each cell a complete knowledge of the scene from the cell's standpoint. It is derived from understanding the relationships between the global objects, cell's local objects, the point of view, the light sources, and the cell's location. As a result, each cell gains an ultimate process and data locality during primary ray tracing, enabling a highly embarrassing data parallelism, linear scalability, high utilization of processors and caches, a reduced memory access, and lack of communication. Moreover, the process locality enables to pre-calculate the workload at each cell and the workload distribution across the entire grid of cells, and then utilizing this knowledge for allocation of processing resources for the best load balancing. The most expensive elements of the prior art, ray-object intersections and traversal of acceleration structures, are dramatically cut down. This is done by exchanging the global and complex task of tracing a ray across many cells, with a local and simple task in an utmost one cell. And most importantly, the algorithm maps efficiently on off-the-shelf CPUs, GPUs and Multicores, without any additional special purpose hardware.

We describe stencils as geometrical means of caching the scene's knowledge in cells, although such a knowledge can be cached by other means as well, e.g. by numerical values. We also describe a grid of uniform cells, whereas grids of non-uniform cells can be used as well. Our stencil based approach is actually an "object looking for rays" policy, where the objects in the scene are projected on cells, as stencils, caching the visibility and shadowing information in cells. The information required for solving the visibility and shadowing quest is now stored directly in the cells instead of in an auxiliary data structure. For the global scene we do not use global accelerating data structures. The runtime processing for primary ray tracing is distributed among cells of a uniform grid in a mutually exclusive way, meaning that there is no exchange of data between cells, and each cell gains maximal locality of processing. The ray tracing is broken down into inexpensive cell-local processes, wherein all the data needed for solving are locally accessible, and the cell-local processes are independent of each other, creating an embarrassingly parallel processing environment.

Thus, the prior art's expensive traversals of data structures are replaced by inexpensive local tests. Moreover, an important feature of the stencil method is a classification of a cell's local segment primary ray according to certainty of intersection, completely eliminating negative tests. This way the majority of intersection tests are cut. The high runtime intersection complexity of prior art $O(N_{rays}*N_{objects})$, is now reduced to $O(N_{local\text{-}objects})$ only, where the $N_{local\text{-}objects}$ stands for the amount of local objects in a cell.

We distinguish between static process locality and dynamic process locality. Static process locality is when all the data required for the local process is attainable in advance, prior to run time, and provided to the cell. In such a case the amount of working load in each cell can be evaluated in advance in the preprocessing stage, and applied for static load balancing by pre-distributing the load among processors. The static process locality is gained in our primary stage of ray tracing, wherein all the local data is prepared during the preprocessing stage. Both our phases of the primary stage, shooting and shadowing, have the characteristics of a static process locality. Dynamic process locality is defined when not all the data feeding the local process are attainable in advance, but some of the local data are generated at run time. E.g. secondary rays from adjacent cells are a product of other local tasks, and must be communicated to a cell prior its local processing. Therefore, in contrast to the primary stage, an inter-cell communication is required. The processing load in such a case cannot be pre-calculated. The dynamic process locality applies to our secondary ray tracing.

In the following specifications we first describe embodiments of the ingredients of the primary ray tracing: ray shooting, shadowing, preprocessing, secondary ray tracing, parallelization and load balance mechanism, as well as the transition between primary and secondary stages. Then we describe implementation embodiments.

Primary Ray Tracing

Both phases of the primary ray tracing stage; ray shooting and shadowing, are based on stencils, which are two dimensional projections of objects on cell's facets, generated in pre-processing stage, and utilized at runtime. Our primary ray tracing (i) greatly reduces the amount of intersection tests, which is the most expensive element of ray tracing, (ii) gains process locality, and (iii) enables good load balancing in runtime by pre-calculating the distribution of load among cells. According to the basic principles of ray tracing, as shown in FIG. 1, primary rays are shot from the point of view (POV), the point from which the scene is observed, through the image plane into the scene, passing across the scene. Primary intersection points are generated as a result of intersection tests. Subsequently, those primary intersection points must be processed for shadowing, i.e. to check whether the point is illuminated or shadowed, by checking for occluding objects between each intersection point and all light sources.

Our analysis of a ray-object intersection of primary rays is done by subdividing the ray into local segments, a segment per each cell along the ray's path, wherein all segments are processed locally, in parallel or in any arbitrary order. Local segments at a cell are generated and analyzed for intersection based on cell's stencil. Two kinds of objects can participate in creation of stencils: local objects that reside, at least partly, inside the cell, and external (or non-local) objects that reside out of the cell. In the ray shooting case both kinds of objects, local and external, are combined to create cell's stencil. Local segments are created only for those shooting rays that hit the stencil. When a ray segment hits the stencil, it means that ray is visible from POV and it must intersect local object. Then the primary intersection point must be found by testing the segment for intersection with the local objects. The shadowing is applied at all the local primary intersection points produced by shooting. On the other hand, the shadow stencil is created by casting external objects only. The local segment of a shadow ray is chosen such that it passes through one of the primary intersection points; its entrance point to the cell from the light source direction and its departure point from the cell are calculated. Its departure point is interrelated with the shadow stencil. A stencil hit means that the respective primary intersection point is in shadow. However in the event of miss, the ray segment must be further tested for an intersection with local objects. Only the local objects that are situated between the light source and the primary intersection point can cast shadow. For shadowing each cell is handled completely autonomously.

The primary ray shooting breaks down into two parts of preprocessing and runtime. (i) During preprocessing the shooting stencils are generated in all the data filled cells, as opposed to empty cells which have no stencils. A cell's stencil is a combined result of projections cast from the point of view by external and local objects on the cell's facets. A cell's stencil caches visibility information about local objects as well as the expected primary processing load in the cell. The shooting stencils are generated in the preprocessing stage. Stencils are not created in empty cells or in cells with no visible objects. Meaning, that even if there are local objects in a cell, but these objects are hidden from the point of view, then the cell is exempted from generating stencils and from runtime primary ray tracing. The area of a shooting stencil in a cell is indicative of the amount of shooting processing load. Therefore a runtime load balancing is enabled by pre-calculating in the preprocessing stage the distribution of shooting load among cells. (ii) The second part is carried out at runtime, utilizing the shooting stencils for finding primary ray-object intersection points. As will become evident, the stencil algorithm helps to greatly reduce the amount of intersection tests, as compared to prior art.

Figure 4B:
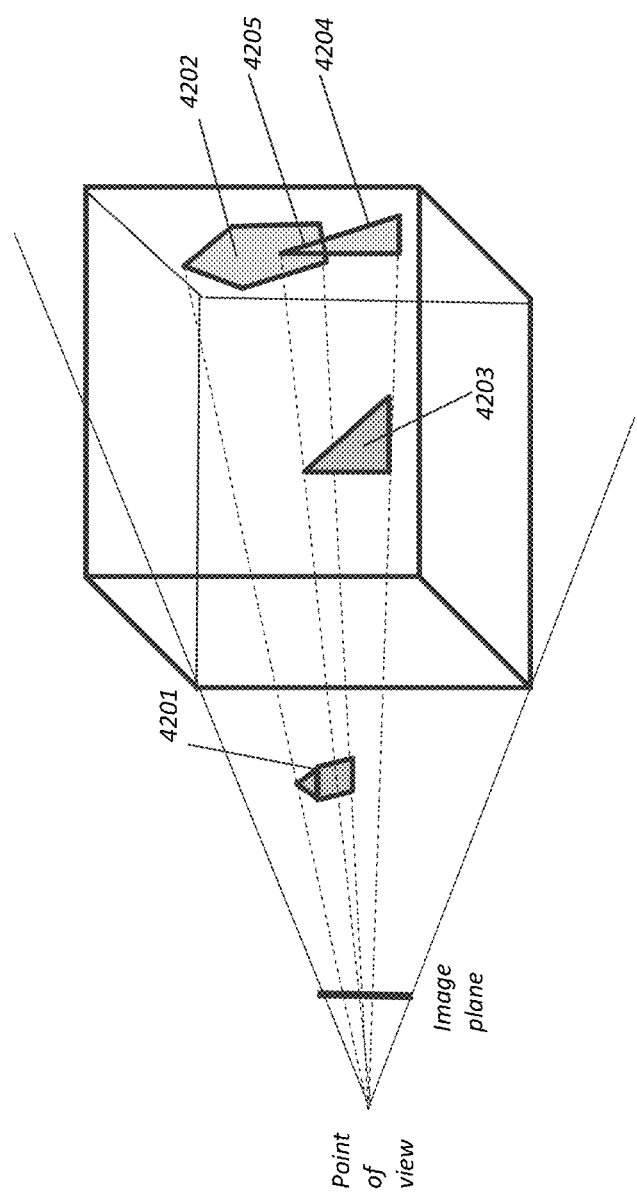
FIG. 4B. A shooting stencil casted on cell's facet resulting of external and internal objects.

The principle of generation and usage of primary stencils is explained by non-limiting examples of FIGS. 4A to 4F. Primary shooting stencils are a projection of objects cast on cell facets, from the point of view (POV) into the cells. The stencils are utilized for locating the ray-object intersections within a cell, and creating the primary points of intersection. FIG. 4A shows an object 4101 viewed from the POV (point of view), creating projections on cells' back facets 4102-4105, ahead of the object. These projections are registered as stencils. The object 4101, local to the first cell 4106, casts a stencil 4102 on the back facet of the cell. Given that the object 4101 is local, and is not occluded by additional objects on the way to POV, all rays hitting the stencil must certainly be intersected by the local object, i.e. all their intersection tests must be positive. All other rays, missing the stencil, do not hit the object; therefore they should not be tested for intersection. As opposed to the first cell, the stencil 4103 of the next cell 4107 caches information of a preceding non-local object, meaning that all the rays originating at POV and departure at the stencil 4103 are already intercepted by some non-local object, therefore they shouldn't be tested for a local intersection. Even if there is a local object projected on stencil 4103 as well, it should be disregarded since it is occluded by the object 4101. This principle is demonstrated in FIG. 4B. Stencil 4202 is a projection of object 4201 encountered in one of the preceding cells. The stencil of the local object 4203 is broken down into two sections: the section 4205 of the stencil is overlapped by stencil 4202, therefore it represents an occluded part of the local object 4203, while the second section 4204 represents the visible part of the local object. The only ray segments that should be locally tested for intersection with objects are those hitting the partial stencil 4204. For all these ray segments the positive result of an intersection test is definite. Moreover, it is certainly known what rays are intersected within a cell, and all the rest must be simply excluded from intersection tests, cutting in advance all negative tests.

Figure 4C:
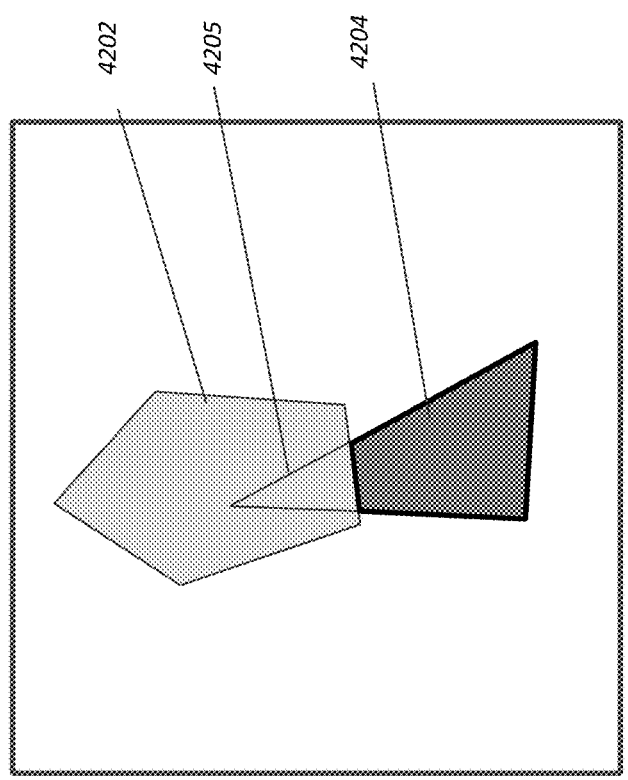
FIG. 4C. Generation of a final shooting stencil as a product of external and local stencils.

The use of primary shooting stencils eliminating unsuccessful intersection tests is illustrated in FIG. 4C. Let's name B the stencil 4202 generated by an external object 4201, and A the stencil generated by a local object, composed of 4204 and 4205. The final shooting stencil $S_{shoot}$ 4204, comprising the stencil part exclusively cast by a local object, and used for indicating positive intersection tests is obtained from A and B by the combined Boolean and arithmetic function:

$$S_{shoot} = A - (A \text{ and } B)$$

Figure 4D:
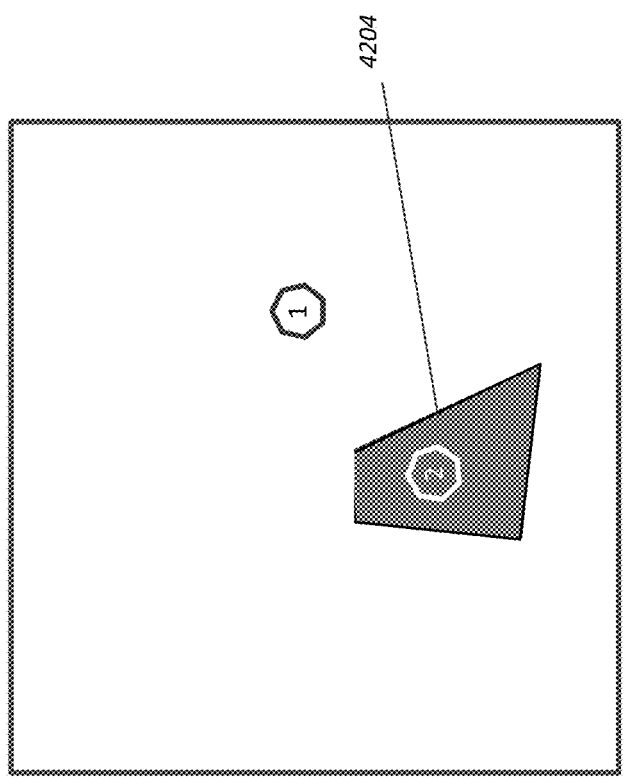
FIG. 4D. Two representing rays in regard to a shooting stencil.

The stencil $S_{shoot}$ is shown in FIG. 4D as the final ray shooting stencil 4204. Two rays are shown representing two different subsets of rays: no hit (1) and local hit (2). The no hit subset of rays stands for rays that either had an earlier hit with one of the occluding objects, or rays that are passing the cell untouched for a later hit, or for no hit at all. The second subset, local hit, consists of rays that encounter a local object, and are therefore subject to intersection tests. The same stands for stencils cast by multiple local objects, eliminating negative tests.

Figure 4E:
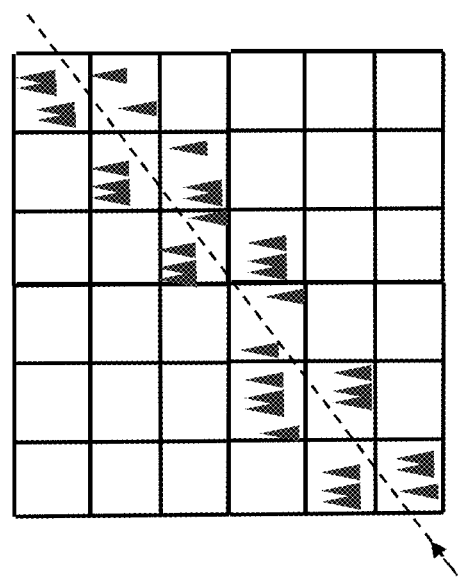
FIG. 4E. Elimination of negative tests illustrated on a ray passing the scene without hitting an object.
Figure 4F:
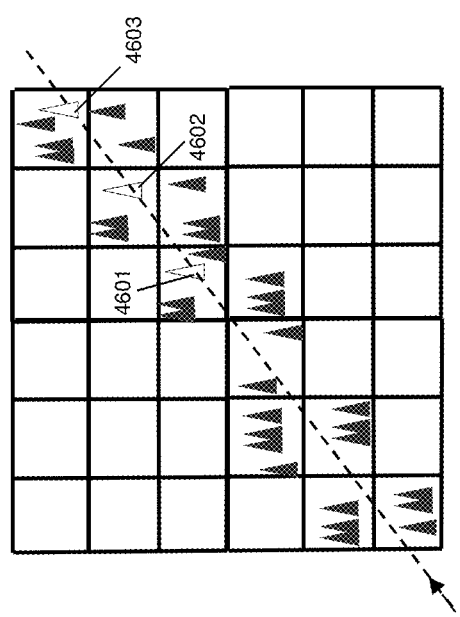
FIG. 4F. Elimination of negative tests illustrated on a ray which intersects with multiple objects.

The advantage of cutting off all negative tests in our ray shooting is illustrated in FIG. 4E. A ray is shown passing the entire scene without hitting an object. In the cells along the track all the ray segments fall in no hit category, therefore the ray has no intersection tests at all. This is to be compared with prior art of FIG. 3A, where the same setting counts 34 negative tests. Another example is given in FIG. 4F, where a ray intersects multiple objects. In all preceding cells before the intersection 4601 the ray segment fall under no hit category. In the cell of intersection 4601 it falls under local hit category. In each of the two successive cells the ray segments fall again under no hit category. Accordingly, the only intersection tests occur in the cell of the object 4601, resulting in at most 4 intersection tests with 4 local objects. This is to be compared with FIG. 3B where the same setting of prior art counts 22 intersection tests.

The local intersection tests maybe, or maybe not supported by local acceleration structures, such as a Kd-tree. When the count of local objects in a cell is high, such a structure would pay off by eliminating many unnecessary tests. However an acceleration structure can be built selectively in the most populated cells only. Moreover, the grid resolution in the preprocessing can be set fine enough to lower the average cell population.

Figure 4G:
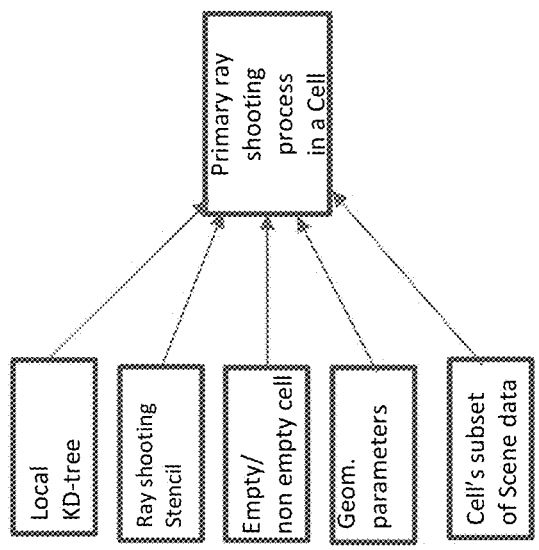
FIG. 4G. Autonomous processing of primary rays within a cell. All the data required to resolve primary ray tracing within the cell is available locally.

In order to confirm the conditions for static process locality of our ray shooting algorithm, we have to make sure that all the data needed for an autonomous processing at a cell is locally available during runtime. FIG. 4G details the ingredients of required data and their sources: (i) the viewing parameters of POV and screen are provided to all cells by the application, and cell's parameters like size and location are provided by the preprocessing stage, (ii) the cell's subset of scene's data is supplied by the preprocessing stage, (iii) emptiness of a cell—empty cells are marked at the preprocessing stage, (iv) shooting stencils are generated for all cells in the preprocessing stage, and (v) local KD-tree for each cell, needed for local intersection tests, is generated in the preprocessing stage as well. Having the above data, each cell can autonomously solve for visibility, which means that a complete static process locality is achieved.

Figure 4I:
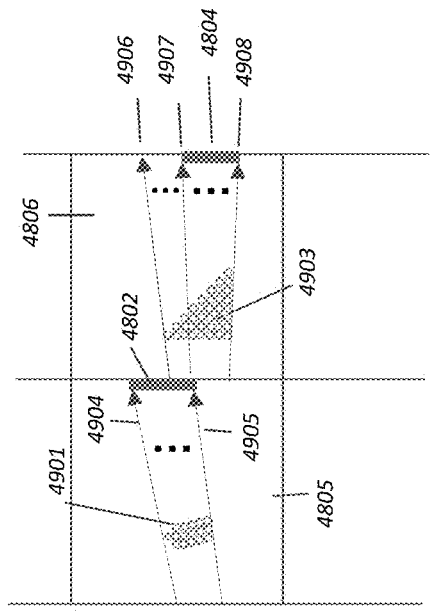
FIG. 4I. A simple example of use of shooting stencils in the primary stage.
Figure 4H:
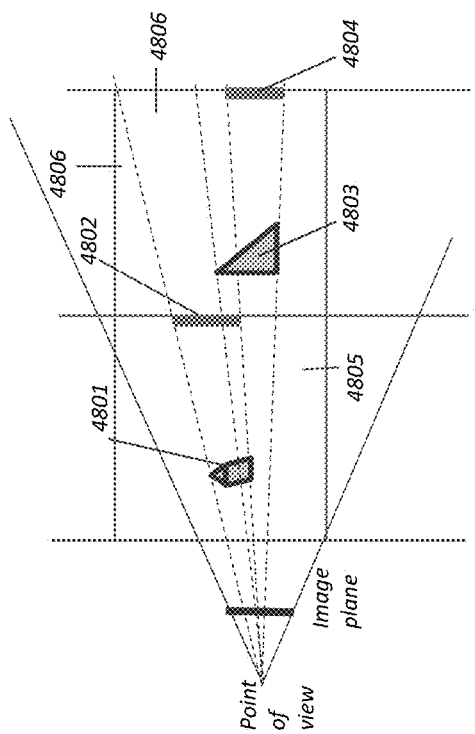
FIG. 4H. A simple example of shooting stencils generated in the pre-processing stage.

FIG. 4H shows generation of primary shooting stencils in the preprocessing stage, and FIG. 4I depicts using these stencils in runtime. In the preprocessing stage the stencil 4802 is cast by object 4801 in the first cell, and the stencil 4804 is the local part of a combined stencil cast by the external object 4801 and the local object 4903 in the second cell. At runtime, FIG. 4I, each of the two exemplary cells is processed autonomously, based on cell-local information with no need of any external data. At a cell all local segments of shooting rays passing through the cell are calculated and tested for hitting the stencil. In cell 4805 only one cluster of these rays is shown, between 4904 and 4905, all hitting the stencil. Each of these rays is tested for intersection, resulting in a point of intersection with the object. 4901 are the bunch of points of primary intersection in cell 4805. In cell 4906 two clusters of shooting rays are shown. Although all rays of the cluster 4906-4907, are passing through the object 4803, but they do not hit the stencil due to their earlier intersections in cell 4905. Rays belonging to the cluster 4907-4908 hit the stencil, defining a bunch of points 4903 of primary intersection.

Figure 5A:
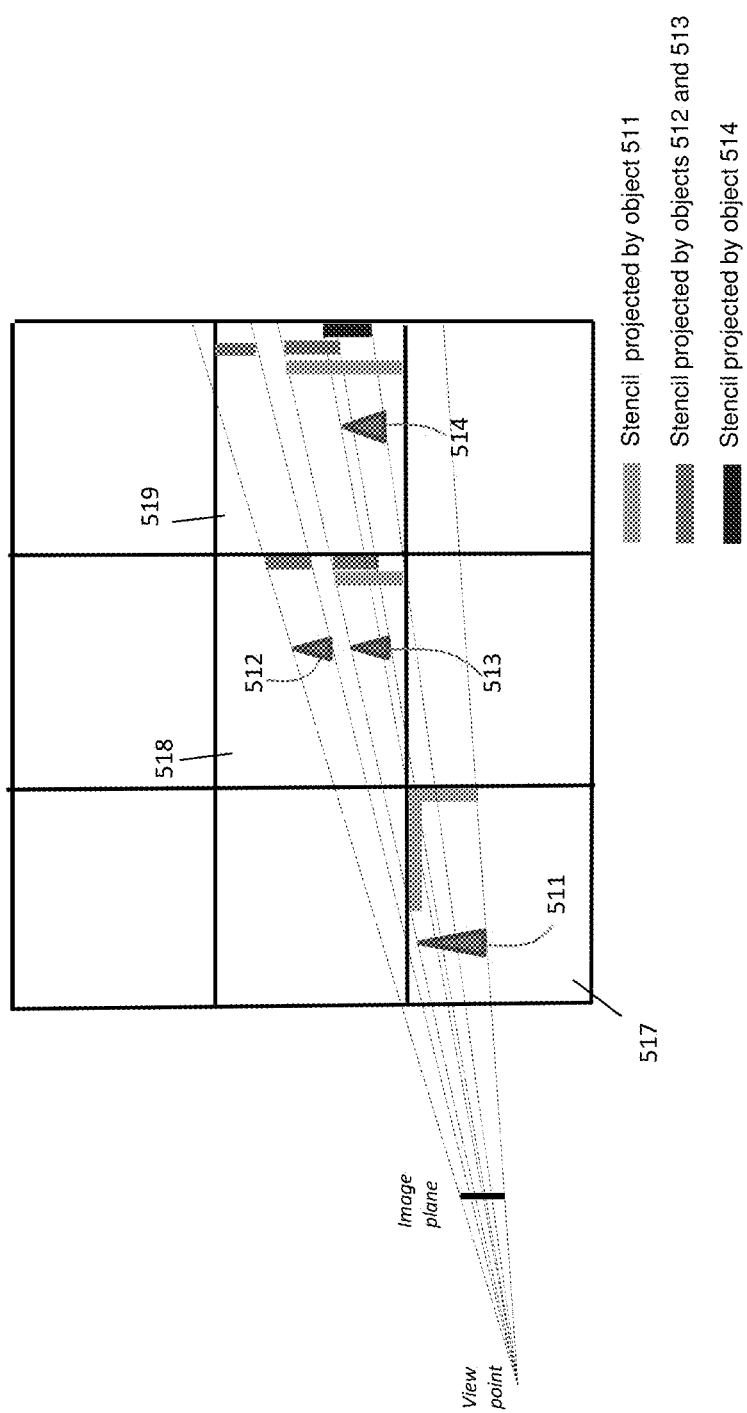
FIG. 5A. Creation of stencils during the pre-processing stage. Each object is being projected on all data filled cells ahead of it, relatively to view point.
Figure 5B:
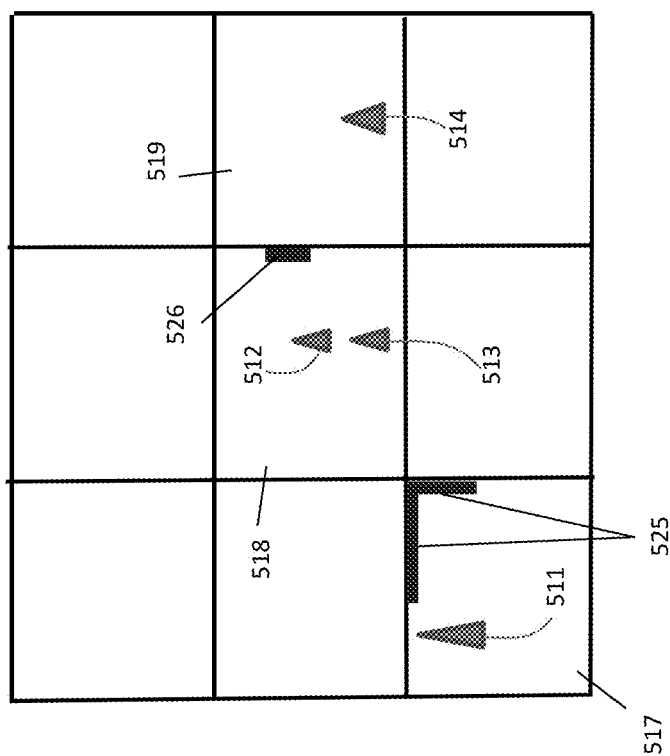
FIG. 5B. Final stencil results of the pre-processing stage. The normalized surface area of a stencil indicates on the processing load in a cell.
Figure 5C:
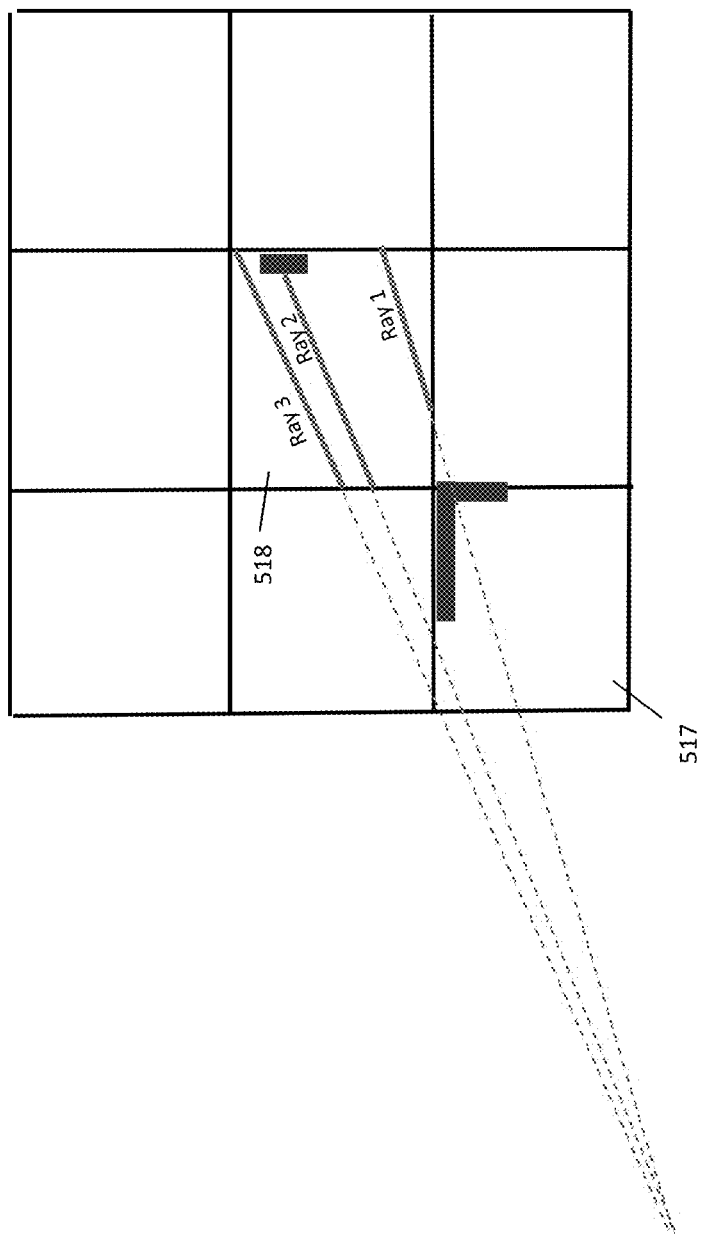
FIG. 5C. Three representative tracing rays at run time.

A detailed process of generating shooting stencils in a preprocessing stage and usage of these stencils in runtime is described by additional non-limiting example. FIG. 5A shows generating stencils during the preprocessing stage on a grid of nine cells, while only three of them are populated by objects, the other cells are empty. Notably, only two objects are visible from POV, 511 and 512. The objects 513 and 514 are hidden by object 511. Each object is being projected on all data filled cells ahead of it, relatively to view point. All the initial components of stencils are shown, assisted by a legend. FIG. 5B shows the final stencil results of the preprocessing stage. The final set of shoot stencils comprises 525 and 526, in cells 517 and 513 respectively. Cell 519 has no stencil because the object 514 is occluded by the object 511. All other cells are empty, without stencils. FIG. 5C demonstrates the use of stencils in cell 518 at runtime. Three representative tracing rays are shown: rays 1 and 3 miss the stencil; therefore they are exempted from intersection tests in the cell. The stencil is hit by ray 2, which is then tested for intersection with the local objects 512 and 513, resulting in a positive intersection with the object 512.

Figure 6A:
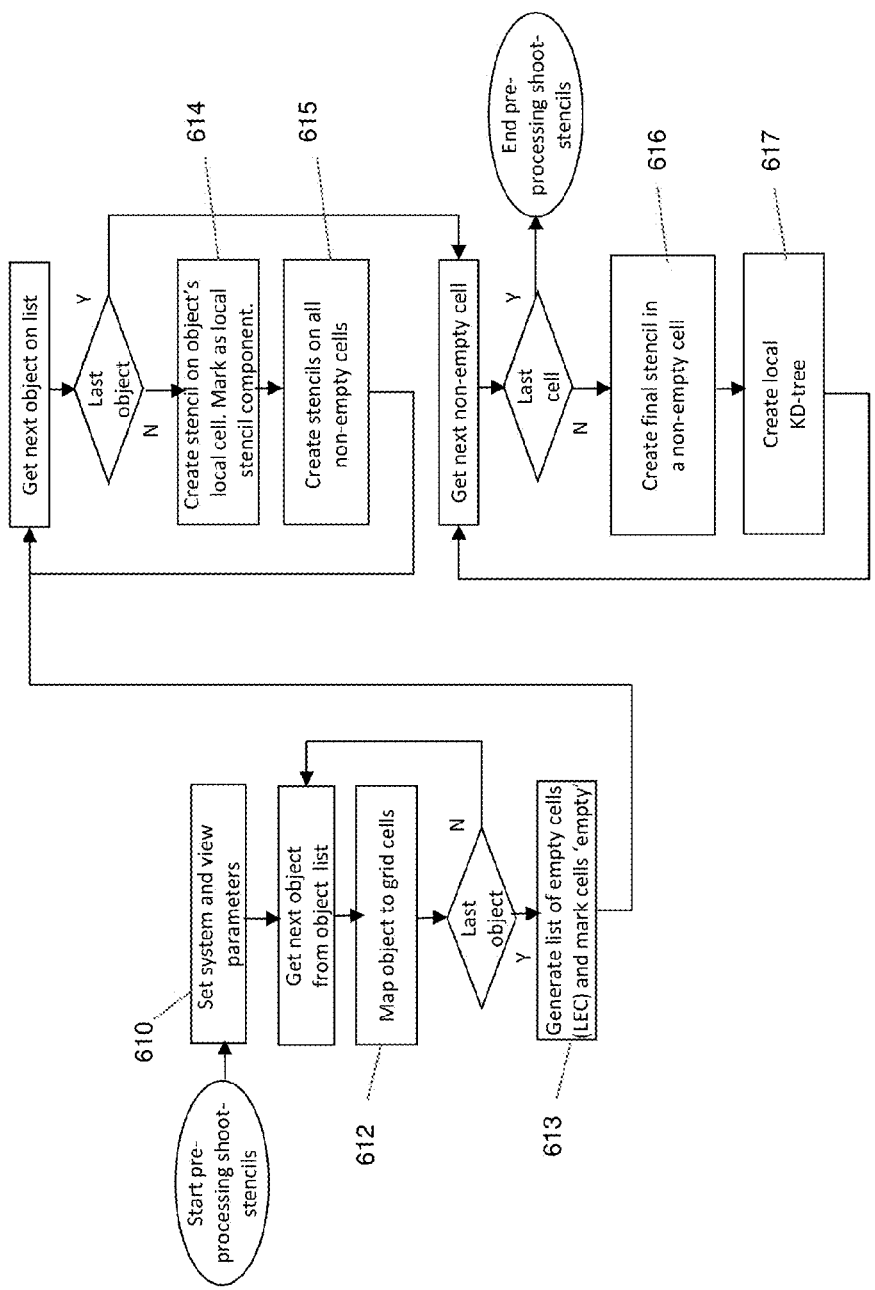
FIG. 6A. Partial preprocessing flowchart: generation of shooting stencils.
Figure 6B:
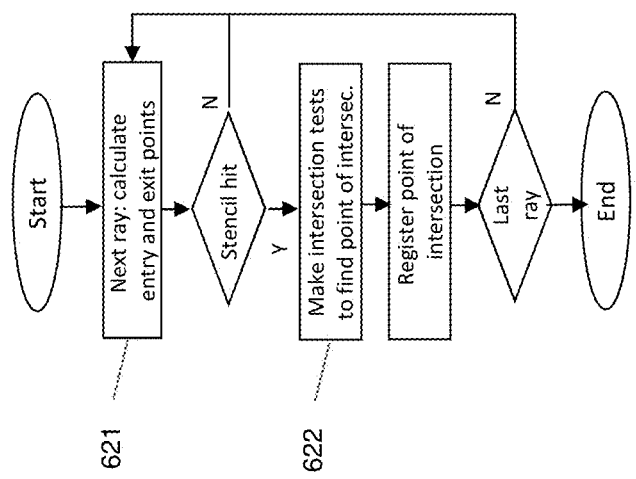
FIG. 6B. Flowchart of a runtime ray shooting process in a cell.

The flowchart of ray shooting is given in FIG. 6A—the preprocessing stage, and in FIG. 6B—the runtime. The preprocessing stage (FIG. 6*a*) starts by setting the system and view parameters 610. The parameters include system parameters (such as the scene size, uniform grid size and resolution), and viewing parameters dictated by the application (such as POV, image plane's size and location). The subdivision of the scene space into uniform grid occurs by mapping the elements of the object list provided by the application (e.g. vertex array, display list, etc.) onto cells 612. Cells that have no object data are marked as empty cells 613. Once the cells are populated, a shoot-stencil can be generated. Each object is taken and projected first on its local cell 614. This stencil is marked as local. Then the object is projected on all data filled cells, cell by cell 615, excluding empty cells. At the end of this step a cell may have two stencils: a local stencil aggregated for all local objects (A), and a global stencil (B), aggregated of all external objects. A final stencil $S_{shoot}$ at each data filled cell is created 616 by separating the exclusively local segments from the global stencil. To this end the combined arithmetic and Boolean formula is applied: $S_{shoot}=A-(A \text{ and } B)$. Finally, a local KD-tree at each data filled cell is generated. It is needed for local intersections. The above described sequence of steps can change in one way or another, e.g. when an object is mapped onto cell 612, taking advantage of having the object 'at hand', a local stencil can be generated earlier than 614. However, the final result is the same.

The flowchart of a runtime ray shooting in a data filled cell is given in FIG. 6B. All the primary rays originated at POV, passing through the image area and entering the cell, are considered. For each such cell a local segment is calculated 621; its entry point and departure point. If the departure point coincides with the shoot-stencil, the ray becomes a subject for intersection tests 622. These intersection tests with local objects are conducted utilizing local KD-tree. Once an intersection is found, the tests are discontinued.

Figure 3C:
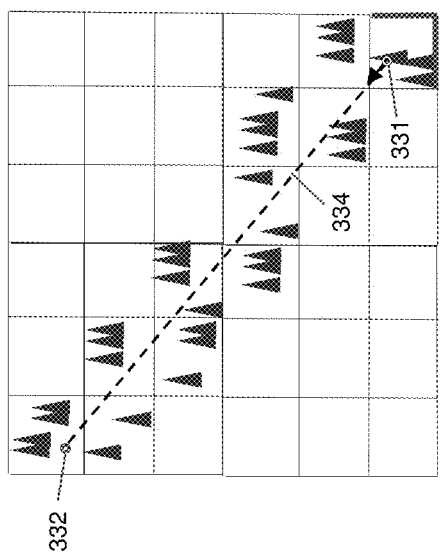
FIG. 3C. Prior art. Shadowing process of primary intersection point in regard to light source. The shadow ray, despite the fact that the intersection point is not occluded, must undergo an abundant negative intersection tests with objects located in cells along the shadowing ray track.

Primary shadowing. Each primary intersection point identified in the ray shooting phase of the primary ray tracing must be tested for shadowing, in regard to light sources. In prior art the shadow test at a primary point of intersection, see FIG. 3C, is accomplished by firing a shadow ray between the point of primary intersection and the light source, seeking for an obstructing object between the point and light source. If the ray reaches the light source without being disrupted, the primary hit point is illuminated by the light source, otherwise it is shadowed. In the example of FIG. 3C the testing ray goes from point of primary intersection 331 to the light source 332 passing many objects without being obstructed, however it must be tested for intersection with every single object on its way. Therefore intersection testing is a highly intensive process, having a high complexity of $O(N_{rays}*N_{objects})$. Although for a shadowed ray the first hit stops the further testing, however prior this hit multiple intersection tests are typically done. Moreover, the illuminated rays with no intersection are the most expensive, because tests must be made all the way from the primary point to the light source.

In contrast to prior art, in our shadowing process we replace such an expensive global search for obscuring objects with a non-expensive local test conducted on local segments of shadow rays. The shadow rays originate at light source and pass through the primary points of intersection, wherein said primary points of intersection are previously generated by the primary ray shooting. In fact, the only segment created, is the one of the cell of test. Our shadowing process is based on use of stencils, termed shadowing stencils, working very similarly to the ray shooting stencils. The shadow stencils are projections by light source on a cell's facets of non-local objects. All shadowing tests are strictly local to a cell, i.e. intersection tests are done between local ray segments and local shadow stencil, or between local ray segments and local objects. For points of primary intersection, a single local test can solve the shadowing question. Thus the prior art's processing complexity of $O(N_{rays}*N_{objects})$ is merely reduced to $O(N_{objects})$.

Figure 7A:
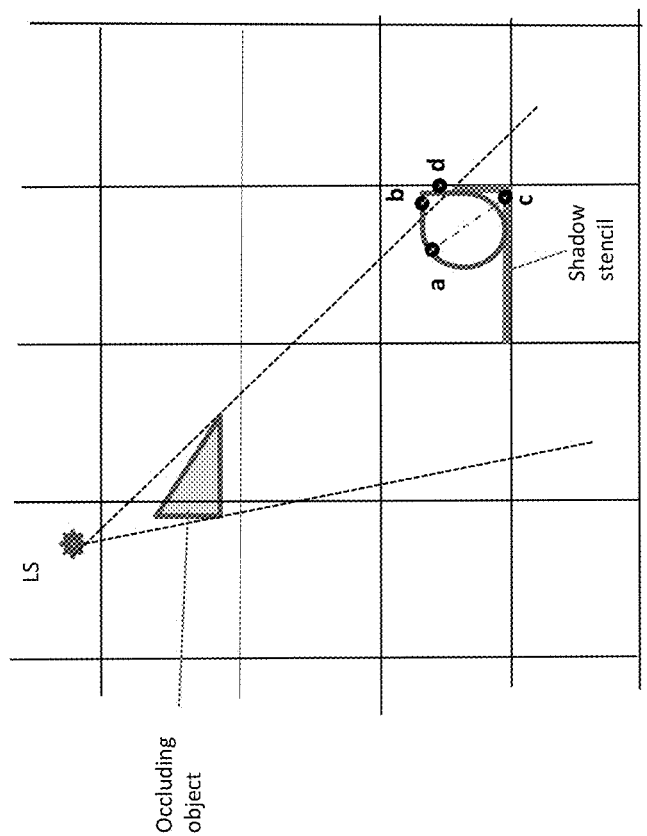
FIG. 7A. Shadow stencils generated on the back facets of cells within the object's shadow volume.

The use of shadow stencil is introduced by non-limiting examples of FIGS. 7A to 7D. As illustrated in FIG. 7A, shadow stencils are generated on the back facets of a cell cast by an occluding object located between a light source and a cell. Preferable, but not necessarily, shadow stencils are generated in the preprocessing stage. Only data filled cells are processed for shadow stencils. In the figure a single data filled cell is depicted. Two primary intersection points, a and b, are shown tested against the shadow stencil: (i) the extended line from the first point a to back facet, along the direction from the light source, hits the shadow stencil at point c. This indicates that the point a is shadowed, (ii) the extended line from point b to back facet, along the light source direction, hits the back facet at point d, out of the shadow stencil, meaning that point b is not shadowed. In both cases the stencil intersection test is simple: it is local to the cell, without the need to access non-local objects in memory, and without conducting expensive 3D ray-object intersection tests. The advantage of the stencil method is demonstrated in FIG. 7B. The primary intersection point 721 is processed for shadowing in regard to the light source 722, by testing a stencil 723 hit by local ray segment 725. The stencil 723 excludes the need of a shadow ray between the intersection point 721 and the light source 722, as in prior art, eliminating the abundant negative intersection tests in all cells along the shadowing ray path.

Figure 7C:
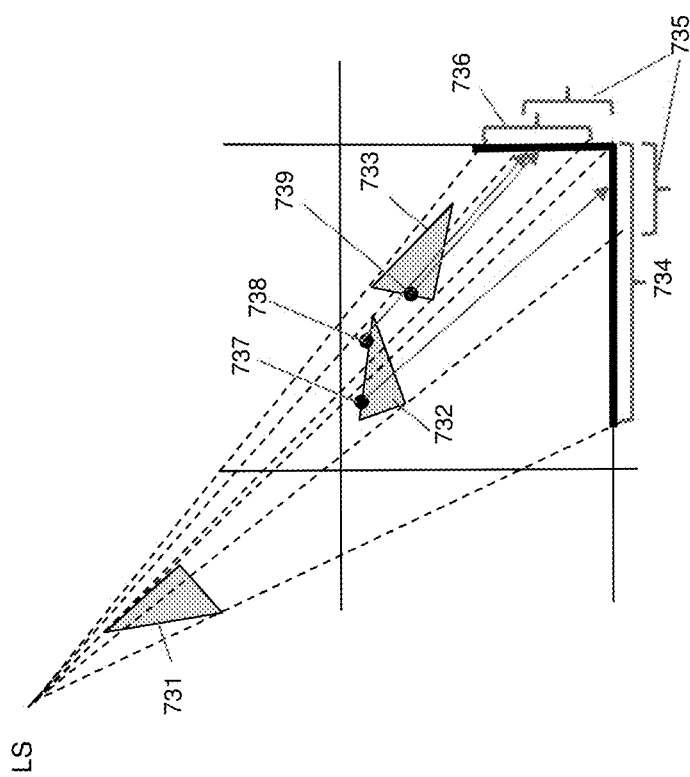
FIG. 7C. An example showing the difference between the casted stencils from external and local objects.

One must differentiate between two kinds of shadowing stencils in a cell. Global stencils which are cast by external objects located between the cell and the light source, and local stencil cast in a cell by local objects. However since local stencils cause ambiguity, global stencils only are used. FIG. 7C explains such an ambiguity. There are three components comprising the final shadow stencil: 734 is a global stencil cast by an external object 731, 735 is a local stencil casted by a local object 732, and 736 is a local stencil casted by another local object 733. The global stencil 734 overlaps partly with the local stencil 735. For each intersection point a stencil is checked for shadowing. When a global stencil segment is hit, even if it occurs in an overlapping part with a local stencil, it means that the intersection point is certainly shadowed.

Figure 7D:
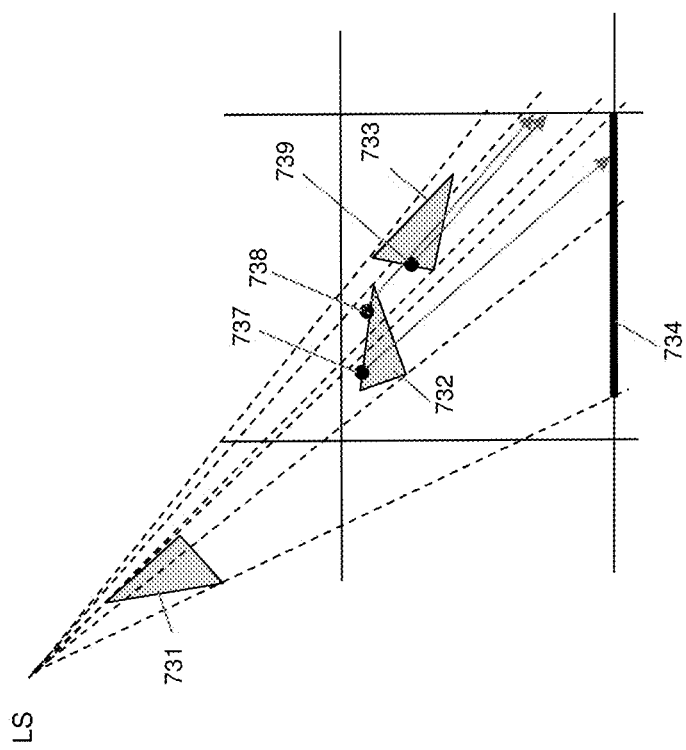
FIG. 7D. Local intersection tests solving shadows from local objects.

However, hitting solely a local component of stencil is ambiguous, and has to be solved by local intersection test. This is evident from the three primary intersection points 737-739. The first point 737 relates to the stencil segment 734, casted by an external object, therefore this point is certainly shadowed. The two intersection points 738 and 739 fall exclusively on locally casted stencils. The first point 738 is illuminated while the second 739 is shadowed. This ambiguity excludes the use of local stencils, and instead, local intersection tests must be conducted after all global-stencil related intersection points are solved. This is shown in FIG. 7D. Global stencil only is used. All intersection points are tested first against the global stencil 734 and sorted for shadowed and non-shadowed. The shadowed intersection points are stored in RIPP (record of intersected primary points), while the non-shadowed primary intersection points are further processed for intersection with local objects. A primary intersection point tested for shadowing by local objects is considered shadowed if an intersection between its associated shadow ray segment and a local objects occurs between the light source and the primary intersection point. If no intersection occurs, or it occurs behind the primary intersection point (relatively to the light source), than the point is considered as non shadowed.

Similarly to the primary stencils, the shadow stencils are also generated in the preprocessing phase, and used at runtime during the primary stage. However, the same shadow stencils are in use in the secondary stage as well. Generic shadowing stencils are created all over the scene, except of in empty cells. All objects in the scene cast shadows, except local objects at each cell, which are not generated. The generating of stencils start at cells containing light sources, or at terminal cells in case of external light sources (e.g. sun). Shadows created from those light sources are projected on the facets of all data filled cells, creating shadow stencils.

To summarize the stencil based shadowing, shadow stencils in data filled cells are first generated by casting non-local obstructing objects in regard to a light source. Then local segments of shadow rays are generated based on primary intersection points, and these local segments are tested for a hit with shadow stencil, wherein primary intersection points whose segments hit the shadow stencil are considered as shadowed, and segments that miss the shadow stencil are further tested for intersection with local obscuring objects.

It must be noted that shadow stencils are indifferent of the location of point of view (POV). They depend only on the mutual position between the scene objects and light sources, therefore changes in the POV do not affect shadow stencils. For that reason, a renewal of shadow stencils is done only upon changes in the scene and in light sources. When a camera (POV) moves in and out or around the scene, without real modification of the scene, the generation of shadow stencil is saved for each frame's preprocessing, leaving the generation of shooting stencils only. The cost of generating shadow stencils depends very much on number of light sources, so when multiple light sources are present, the saved preprocessing time may be significant.

Figure 7E:
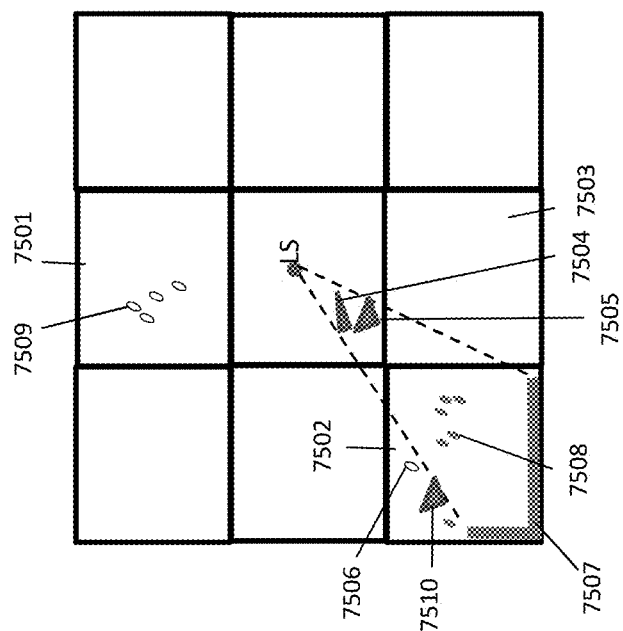
FIG. 7E. Shadowing of primary intersection points.

FIG. 7E shows a non limiting example of generation and usage of shadow stencils. Two non empty cells are shown, 7501 and 7502, one light source LS and three obstructing objects 7504, 7505, and 7510. In the preprocessing stage each of the objects is taken in a turn to generate shadow stencils. Object 7504 cast a stencil 7507, related to the LS, on cell 7502. All other cells situated in the object's shadow volume are empty. Similarly object 7505 adds its contribution to the stencil 7507. The third object 7510, a resident of cell 7502, do not contribute its part to that 7507 stencil, because their mutual locality. It may rather cast stencils on farther cells (not shown). Cell 7501 remains without stencils, since there are not objects to cast shadows on it. Empty cells, e.g. 7503 are not processed for stencils. The cell of light source remains without stencil as well since the two objects 7504 and 7505 do not cast stencils in this cell, being local to it.

Runtime starts with primary shooting phase, which results in storing primary intersection points of each cell in its local RIPP (record of intersected primary points). In the given example there are two clusters of primary intersection points, cluster 7509 of 4 points in cell 7501, and cluster 7508 of 7 points in cell 7502. Now starts the runtime shadowing phase of the primary stage. At each cell, completely independently of other cells, the primary intersection points are tested for shadowing. In the cell of LS there are not intersection points, therefore no tests. In cell 7501, due to lack of stencil, all points of the local RIPP are apparently marked as non shadowed (i.e. illuminated). In cell 7502 the 7 RIPP points are first tested against the stencil. 4 points are found as related to the stencil, then marked as shadowed and removed from RIPP. The two other points are tested locally for intersection with object 7510. One point is found as shaded by the local object, and marked accordingly. The other point 7506 is marked as non-shaded, and removed from RIPP.

Figure 8A:
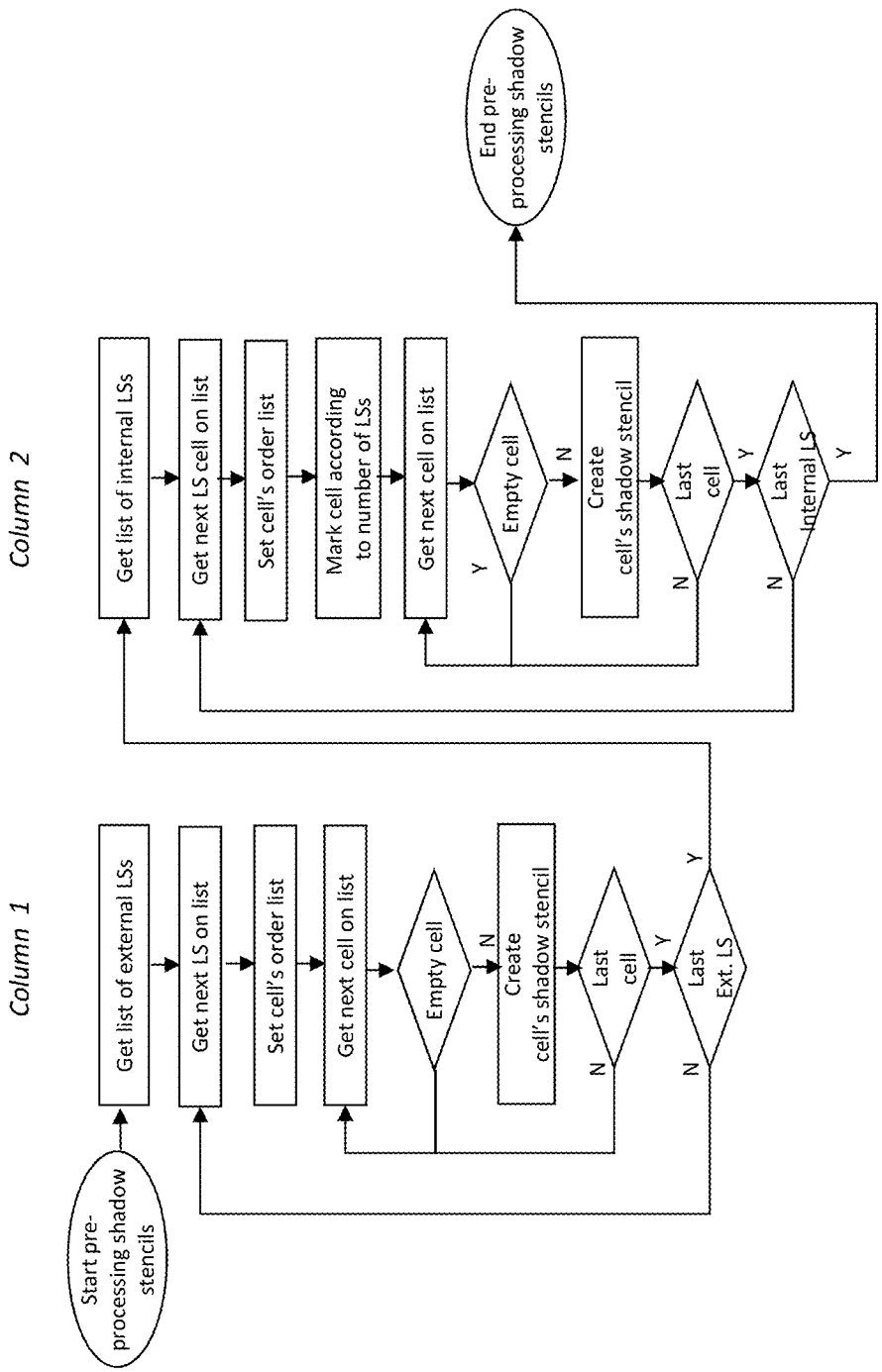
FIG. 8A. Partial preprocessing flowchart: generation of shadow stencils
Figure 8B:
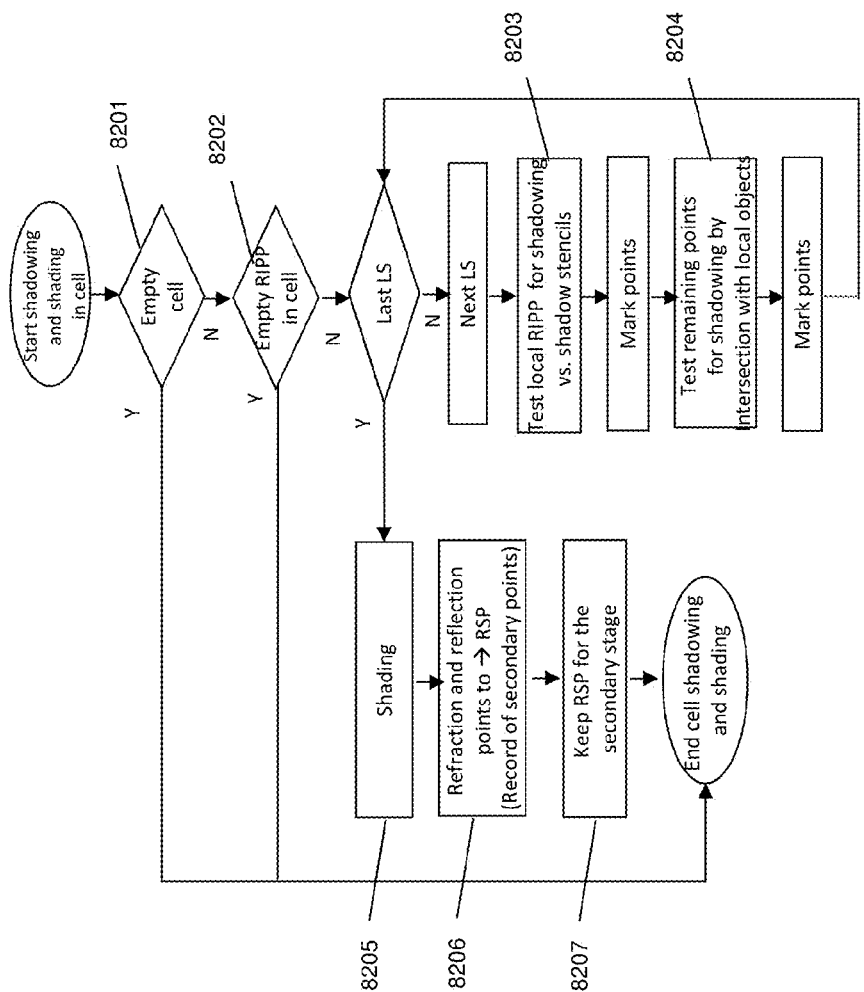
FIG. 8B. Flowchart of the run time shadow processing in a cell

The flowchart explaining generating and use of shadow stencils is depicted in FIGS. 8A and 8B. The shadowing part of preprocessing in FIG. 8A is a continuation of generating the shooting stencils of FIG. 6A. Each object is taken in a turn, to cast its shadow stencil in all data filled cells, skipping its resident cell. When cast in a cell, it is merged with the existing stencil previously cast in the cell by other objects from the same light source 811. This is repeated for all light sources.

The runtime (primary stage) use of shadow stencils is flowcharted in FIG. 8B. The flowchart refers to a single cell since shadowing is a strictly local and autonomous process at each cell. The shadow stencils, created during the primary ray shooting, are applied to all primary intersection points in RIPP. An empty cell is exempted from shadowing 8201, so is a cell with no primary intersection points (RIPP empty) 8202. The following shadowing process repeats for each light source. All RIPP points are tested first 8203 against the cell's shadow stencil. Points that are found hitting the stencil are marked as shadowed. The other points are tested for intersection with local objects 8204. A point that is found obscured from the light source is marked as shadowed; otherwise it is apparently marked as illuminated. Once all light sources are exhausted and each point in the local RIPP is marked for shadowing in regard to all light sources, shading 8205 of these points is done. During the shading, points having reflecting and/or refracting quality are transferred 8206 to the record of secondary points (RSP) as an input to the secondary stage 8207.

Performance of the Runtime Shooting and Shadowing

One of the leading advantages of our stencil based shooting and shadowing is their improved performance, due to breaking down one big and complex task of prior art into many small, local tasks. Our use of uniform grid cuts down the expensive traversals of the global KD-tree (or other acceleration structures), and our localization of processing saves over 90% of the most expensive element of prior art, the intersection tests. The performance advantage of our algorithm is demonstrated herein, still in its basic sequential form, prior any parallelization. As it will become evident hereinafter, an enhanced load balancing of our parallelization adds another important improvement to the performance. Our performance analysis is based on the model of ray shooting performance developed by Vlastimil Havran in *Heuristic Ray Shooting Algorithms*, Czech Technical University, Prague, 2000, p. 24.

$$T_R = (N_{TS}*C_{TS} + N_{IT}*C_{IT})*N_{rays} + T_{app} = \text{(cost of transversal+cost of intersection)}*N_{rays} + T_{app}$$

$N_{TS}$ Average nodes per ray accessed $C_{TS}$ Average cost of traversal step among the nodes (incl. mem. access)

$N_{IT}$ Average number of ray-object intersection tests per ray $C_{IT}$ Average cost of intersection test $T_{app}$ Remaining computation (same for all algorithms)

The performance model separates the cost of ray traversal and the cost of ray-object intersection tests. The last element $T_{app}$ consists of shading and other remaining computations. Since it is the same for all algorithms, it is not part of our performance comparison. Havran's model, applied to a ray tracing system, assists in making comparative analysis of the runtime phases of ray shooting and shadowing, both implemented first by a prior art algorithm and then by our stencil based algorithm. The following ray tracing system is assumed:

- A scene is subdivided into grid of $43^3$, having in total 79,507 uniform cells.
- The scene data comprises 1,280,000 triangles with a uniform distribution of 10 triangles/cell.
- Each cell is further subdivided into grid of $2^3$ sub-cells, to be solved for intersections by a small local KD-tree.
- The number of primary rays is 4,000,000.
- An average number of local rays (passing a cell) is 2,163 rays/cell (4,000,000/$43^2$).
- An average ray's longest path is 67 cells (43*1.5) across the 3D space.
- An average ray's longest local path within a cell is 6 sub-cells.
- $C_{TS}$=0.3 traversal step for a big global KD-tree (according to Havran)
- $C_{TS\_local}$=0.1 traversal step for a small local KD-tree (an approximate)
- $C_{IT}$=0.7 (according to Havran).
- As a rule of thumb, the number of cells in a spatial subdivision structure should be of the same order as the number of objects N in the scene. At each cell there are on average 2 intersection tests, therefore $N_{IT}$=2 for an average of 10 objects/cell.
- A hit occurs on average in the middle (half the discrete space: 43/2*1.5), in the 38$^{th}$ cell, therefore $N_{TS}^{hit}$=38.
- When no hit occurs, then a ray passes the entire space, visiting in average $N_{TS}^{no\ hit}$=67 cells.
- The system assumptions are:
- 50% of rays hit objects generating primary intersection points. Each hitting ray generates one intersection point.

Prior Art Ray Shooting Performance.

The height of Global KD-tree having 79,507 leaf cells is 17, ($2^{17}$=128,000).

The height of Local KD-tree having 8 leaf sub-cells is 3, ($2^3$=8).

For each ray, two series of KD-tree traversals are performed, first of the global tree to find the next cell to visit along the ray's path, and then in the next visited cell the local tree is traversed to assist in ray-object intersection tests. We assume that by using the local KD-tree the number of intersections per ray is reduced from 10 (number of local objects) to 2 per cell.

In order to differentiate between the traversal and intersection elements, we formulate the cost expression in the following way:

$$T_{shoot} = [\text{Global\_traversals} + \text{Local\_traversals} + \text{Intersection\_tests}]^{hit} +$$
$$[\text{Global\_traversals} + \text{Local\_traversals} + \text{Intersection\_tests}]^{no\ hit}$$
$$= [N_{TSG}^{hit} * C_{TS} * 1/2 N_{rays} + N_{TSG}^{hit} * (N_{TSL}^{no\ hit} * C_{TS\_local}) *$$
$$1/2 N_{rays} + N_{TSG}^{hit} * (N_{IT} * C_{IT}) * 1/2 N_{rays}] +$$
$$[N_{TSG}^{no\ hit} * C_{TS} * 1/2 N_{rays} + N_{TSG}^{no\ hit} * (N_{TSL}^{no\ hit} * C_{TS\_local}) *$$
$$1/2 N_{rays} + N_{TSG}^{no\ hit} * (N_{IT} * C_{IT})] * 1/2 N_{rays}]$$

$$\rightarrow T_{shoot} = 38 * 0.3 * 2,000,000 + 38 * (3 * 0.1) * 2,000,000 +$$
$$38 * (2 * 0.7) * 2,000,000 + 67 * 0.3 * 2,000,000 +$$
$$67 * (6 * 0.1) * 2,000,000 + 67 * (2 * 0.7) * 2,000,000 =$$
$$151,000,000 + 308,200,000 = 459,200,000$$

Total of Global_traversals=22,800,000+40,200,000=63,000,000

Total of Local_traversals=22,800,000+80,400,000=103,200,000

Total of Intersection_tests=106,400,000+187,600,000=294,000,000

It is evident that the intersection tests are the most costly part in primary shooting.

Stencil Based Shooting Performance.

Each ray is processed in a single cell along its path, and is subject to traversal of the local KD-tree in that cell, tested for intersection with 2 out of 10 objects. A 'no hit' rays are not generated and make no tests.

At each cell there are 50 segments of rays (4M rays/$43^3$ cells), but only ½ of these segments are generated. Therefore $N_{IT}$=25 ray segments. The cost of generating a local segment of a ray is estimated as $C_{ray\_segm\_gen}$=0.2.

$$T_{shoot} = (\text{Generating\_local\_ray\_segment} +$$
$$\text{Local\_traversal} + \text{Local\_intersection\_tests}) *$$
$$\text{Nbr\_of\_hitting\_rays}$$
$$= (C_{ray\_segm\_gen} + 3*C_{TS} + 2*C_{IT}) * \text{Nbr\_of\_hitting\_rays}$$

$$T_{shoot} = (0.2 + 3*0.1 + 2*0.7) * 2,000,000 =$$
$$4000,000 + 600,000 + 2,800,000 = 3,800,000$$

Total of Global_traversals=0, which are 0% of prior art.
Total of Local_traversals=600,000, which are 0.6% of prior art.
Total of Intersection_tests=2,800,000, which are about 1% of prior art.
Total of ray segment gen.=400,000, whereas in prior art it is 0. However the segment generation consists less than 0.1% of $T_{shoot}$ of prior art.

Our shooting performance compared to prior art is about 120 times faster, and can be summarized as follows: (i) Intersection tests, the most costly ingredient of ray tracing, are reduced to 1% of prior art. (ii) Global KD-tree traversals are completely eliminated. (iii) Local KD-tree traversals are reduced to 0.6% of prior art. (iv) We append generation of ray segment which takes merely 0.1% of the shooting time of prior art.

Prior Art Primary Shadowing Performance.

For comparison of the shadowing performance we use the same basic equation, evaluating the primary intersection points consisting of 50% of all rays. Further we assume that 68.75% of these intersection points are shadowed.

$$T_{shadow} = [\text{Global\_traversals} + \text{Local\_traversals} + \text{Intersection\_tests}]^{hit} +$$
$$[\text{Global\_traversals} + \text{Local\_traversals} + \text{Intersection\_tests}]^{no\_hit}$$
$$= N_{TSG}^{hit} * C_{TS} * 1/4N_{rays} + N_{TSG}^{hit} * (N_{TS}^{no\ hit} * C_{TS}) * 1/4N_{rays} + N_{TSG}^{hit} *$$
$$(N_{IT} * C_{IT})] * 1/4N_{rays} + N_{TSG}^{no\ hit} * C_{TS} * 1/4N_{rays} + N_{TSG}^{no\ hit} *$$
$$(N_{TSL}^{no\ hit} * C_{TS}) * 1/4N_{rays} + N_{TSG}^{no\ hit} * (N_{IT} * C_{IT})] * 1/4N_{rays}$$

Assumptions:

An average distance between primary point of intersection and light source is 34 cells. Therefore global average values are:
$N_{TSG}^{hit}$=17 cells, $N_{TSG}^{no\ hit}$=34 cells.
At each cell along the path of 34 or 17 cells, on average 2 local intersection tests per cell. $N_{IT}$=2.
Local values are: $N_{TSL}^{no\ hit}$=6, $N_{TSL}^{hit}$=3

$$T_{shadow} = 17 * 0.3 * 1,375,000 + 17 * (6*0.3) * 1,375,000 + 17 *$$
$$(2*0.7)] * 1,375,000 + 34 * 0.3 * 625,000 + 34 * (6*0.3) *$$
$$625,000 + 34 * (2*0.7)] * 625,000$$
$$= 7,012,500 + 42,075,000 + 32,725,000 + 6,375,000 +$$
$$38,250,000 + 29,750,000 = 156,187,500$$

Total time of Global_traversals=13,387,500
Total time of Local_traversals=80,325,000
Total time of Intersection_tests=62,475,000
As before, the intersection tests show as the most costly part in primary shadowing.

Stencil Based Primary Shadowing Performance

We define two additional parameters:
$N_{ip}$—total number of primary intersection points in an average cell,
$C_{sten.test}$—cost of a shadow stencil test.

During the shooting phase, each of 2,000,000 rays generated an intersection point. We assume that ½ of these points are shadowed. At the local scale, in an average cell the number of intersection points is (2,000,000 rays/128,000 cells):

$N_{ip}$=16 points, when 68.75% are shadowed, alias 11 shadowed and 5 non-shadowed.

All 16 points are first being intersected with the shadow stencil. This intersection with a 2D shape is non-expensive, it is estimated as:

Csten.test=0.2 (as compared to $C_{IT}$=0.7).

We assume that 10 points out of the 16 are covered by shadow stencils (i.e. shadowed), and the additional 6 need local intersection tests, out of them only 1 is found shaded.

The shadow processing in a cell consists of two steps:
(i) stencil intersection tests find the globally shadowed intersection points, and
(ii) ray/local_objects intersection tests are done for finding locally the shadowed primary intersection points. Local KD-tree is in use. Positive test ($N_{TS}^{hit}$) hits an object at an average 3 local sub-cells. Negative test ($N_{TS}^{no\ hit}$) makes a track of 6 sub-cells without hitting an object.

$$T_{shadow} = T_{cell\_shadow} * \text{total\_nbr\_of\_cells}$$
$$= (\text{Stencil\_tests} + \text{Local\_traversals} + \text{Local\_intersection\_tests}) *$$
$$\text{total\_nbr\_of\_cells}$$
$$= [16 * Csten \cdot \text{test} + (5*6*C_{TS} + 1*3*C_{TS}) + 6*2*C_{IT}] *$$
$$\text{total\_nbr\_of\_cells}$$

$$T_{shadow} = 16 * 0.2 * 79,507 + (5*6*0.3 + 1*3*0.3) * 79,507 + 6*2*$$
$$0.7 * 79,507$$
$$= 254,422 + 214,670 + 668,000 = 1,137,000$$

Total of Global_traversals=0, which are 0% of prior art.
Total of Local_traversals=214,670, which are 0.3% of prior art.
Total of Intersection_tests=668,000, which are about 1% of prior art.
Total of stencil tests=254,422, whereas in prior art is 0. However this element consists less than 0.2% of $T_{shadow}$ of prior art.

Our shadowing performance compared to that of prior art is over 130 times faster, and can be summarized as follows: (i) Intersection tests, the most costly ingredient of ray tracing, are reduced to 1% of prior art. (ii) Global KD-tree traversals are completely eliminated. (iii) Local KD-tree traversals are reduced to 0.6% of prior art. (iv) tests of stencils, a new ingredient, takes merely 0.2% of the shadowing time of prior art.

To summarize performance comparison of the primary stage, we save about 99% of intersection tests, the most costly elements of prior art, and about the same of accelerating structure traversals.

Parallelism.

The object of parallel processing is to find a number of preferably independent tasks and execute these tasks simultaneously on different processors. Because in ray tracing the computation of one pixel is completely independent of any other pixel, this algorithm lends itself very well to parallel processing. This would then lead to the simplest possible parallel implementation of a ray tracing algorithm. Superficially, ray tracing does not seem to present any great difficulties for parallel processing. Apart from correctness and robustness, efficiency and performance are of utmost importance. However, for this end the most difficult problem to address, is the fact that the number of rays passing through each voxel is likely to vary. Certain parts of the scene attract more rays than other parts. This has mainly to do with the view point and the location of the light sources. Both the variations in cost per ray and the number of rays passing through each cell cause poor utilization of processing and memory resources, critically deteriorating performance. This issue calls for just right load balancing. In prior art an effective load balancing, without the overheads of dynamic load balancing, is unattainable in view of the fact that the workload can't be precalculated prior runtime. In contrast to the prior art, we are able to precalculate these workloads based on stencils, and distribute the work to processors accordingly, for a balanced load in runtime. The benefit of it spans on the primary stage of our raytracing.

Load predictability can be achieved only if the runtime processing at each cell is fed with data which is prepared in advance of the runtime and is invariable during cell processing. Moreover, the processing is strickly local, completely isolated and not affected by other cells. As argued before, this is static process locality, which is a prerequisite for forecasting the workload and allocating the processing resources accordingly. However, if some of the process inputs are generated in run time, e.g. as a product of preceding task, it becomes a dynamic process locality. The processing load in such a case cannot be pre-calculated; therefore in such a case a dynamic load balancing must be applied, paying the overhead toll. In terms of parallel processing the load is balanced by demand driven approach, dynamically assigning cells to processors.

In our parallelism we apply both: the static load balancing of multiple processors of the primary stage is based on static locality, while the demand driven way of parallelizing multiple processors in the secondary stage, is based on dynamic locality. Within each stage, the utilization of processing resources is maximized by enhanced load balance, whereas during the transition between stages, the idle time is minimized by applying an efficient transition strategy. The speed-up to be expected with this combined type of parallelism is near linear with the number of processors. As stated before, the ability to precalculate loads is conditioned by presence of static process locality. In turn, this load precalculation is necessary for balancing the loads of shooting and shadowing processes. Therefore, it is necessary to confirm the static locality in ray shooting and shadowing.

Ray shooting. In general, solving for visibility of local objects from the view point is conditioned by having known the setup parameters (view point, screen location, and cell location), disrupting objects on the way to the cell, and local objects in the cell. In prior art, visibility is solved per ray, which passes multiple cells and multiple data subsets when seeking for intersection, so there is no process locality. What is needed for process locality, aka the capability to solve visibility from inside the cell, is to provide each cell with the information of (i) setup parameters, (ii) local object data, and (iii) earlier obscuring objects. The setup parameters and local object data are up priory known at each cell. The information on obscuring non-local objects is cached in the shooting stencils makes the process locality at primary ray shooting possible.

Shadowing. In order to locally solve for shadowing in a cell we need to know: (i) light source(s), (ii) objects located between the light source and the cell, casting shadows on the cell, and (iii) local objects. All these are known: the list of light sources is accessible to all cells, the list of local objects is known to each cell, and the shadows casted by non-local objects are cached in shadow stencils.

Consequently, by adopting data parallel approach and implementing the stencil algorithm, the conditions for process locality of both processes, shooting and shadowing, are met. At run time each cell has all the required data for these two processes. Due to process locality the processing amount at each cell is a sole function of the local data, undisturbed by runtime developments and inter-cell communication. All the data is available prior the primary stage, no new data is added during the stage, making the local process a static. Then, not only our primary stage occurs autonomously within each cell, but also the static process locality gives rise to predictability of working loads and an enhanced load balancing.

As said, our load balancing is based on the ability to pre-calculate the workload at each cell and the workload distribution across the grid of cells. This knowledge is utilized to allocate the processing resources for the best load balancing. Load balancing is assisted by the pre-calculated distribution of shooting and shadow workloads among cells. The surface area of the shooting stencil and the shadow stencil, as well as the number of local objects in a cell are indicative of the primary stage's workload in a cell. Therefore the expression to be used in calculating the primary load in each cell breaks down into two terms of ray shooting and shadowing. The workload in a cell is proportional to the number of primary points of intersection during the shooting phase and the number of primary intersection points and local objects during the shadowing phase. The count of the primary intersection points is proportional to the stencil's surface area. Let's term the surface area of the shooting stencil $A_{shoot\_stencil}$. Then the cell's primary processing load is given by:

$$\text{Load1} = k * A_{shoot\_stencil}$$

The constant k is inversely proportional to cell's distance from view point.

In order to develop an expression for the shadow workload in a data filled cell, we denote first the ratio between shadow stencil area and the total cell wall area as $\beta$:

$$\beta = \frac{\text{shadow stencil area}}{\text{cell wall area}}$$

and its complementary unshaded ratio as $\alpha$: $\alpha = \beta - 1$

Since the number of primary intersection points in a cell is specified by Load1, then the cost of shadow stencil tests in a cell is $\beta *$Load1.

Cell's shadowing load for a single light source is given by the following two terms. The term associated with $\beta$ stands for the stencil tests of primary intersection points shadowed by non-local objects. The other term, associated with $\alpha$ stands for the local intersections tests for primary intersection points that are not covered by shadow stencils, but are subject to shadowing by local objects.

$$\text{Load}_{single\_LS} = \text{local intersection tests} + \text{stencil tests} = \alpha * \text{Load1} * f(N) + \beta * \text{Load1} = \text{Load1}(\alpha * f(N) + \beta)$$

The component f(N) is functionally proportional to the number of local objects in the cell. The non-linearity of this term stems from the possible use of accelerating data structures, such as KD-tree, Octree, or other. Apparently, the first part of the equation is dominant in cells that are located near to light sources, while the second part in the more distant cells. If K is the number of light sources, then the shadowing load for multiple light sources is:

$$Load2 = Load1 * \Sigma_{n=1}^{K}(\alpha_n * f(N) + \beta_n)$$

And finally, the aggregated primary load at each cell is given by:

$$Load_{primary} = Load1 + Load2$$

As argued above, pre-calculating the processing load is conditioned by predictability of ray tracing process, which in turn is enabled by locality of processing. The load prediction at each cell is a product of stencil algorithm; the size of the shooting stencil area at each cell indicates on amount of intersected rays, i.e. processing load. In the pre-processing stage stencils are generated, cell workloads are extracted from stencils, and load distribution across the scene is mapped. Once the load distribution is known ahead of run time, the scene can be optimally distributed among available processors for balanced run time processing.

In order to make the static load distribution scheme of the primary stage flexible and tunable, the uniform grid of cells is subdivided into modules. The number of modules reflects the amount of computing resources in the system. But each module's size can vary by number of cells, dispersion across the scene space, and by assigned processing resources, for the best load/processors match. The tune up of processing load within a module is achieved by prioritizing its processing resources among the cells in run time. A simultaneous completion of processing at each module is not expected at all. Each module, upon completion of the primary processing across its cells, disintegrates into individual cells to join the secondary stage, and the assigned processor instantaneously becomes active in the new stage without spending any idle time. The transition mechanism to secondary stage is described in details hereinafter. Such a combined load balancing mechanism can address even the most extremely imbalanced cases, such as the famous 'rabbit in the stadium'.

Figure 9A:
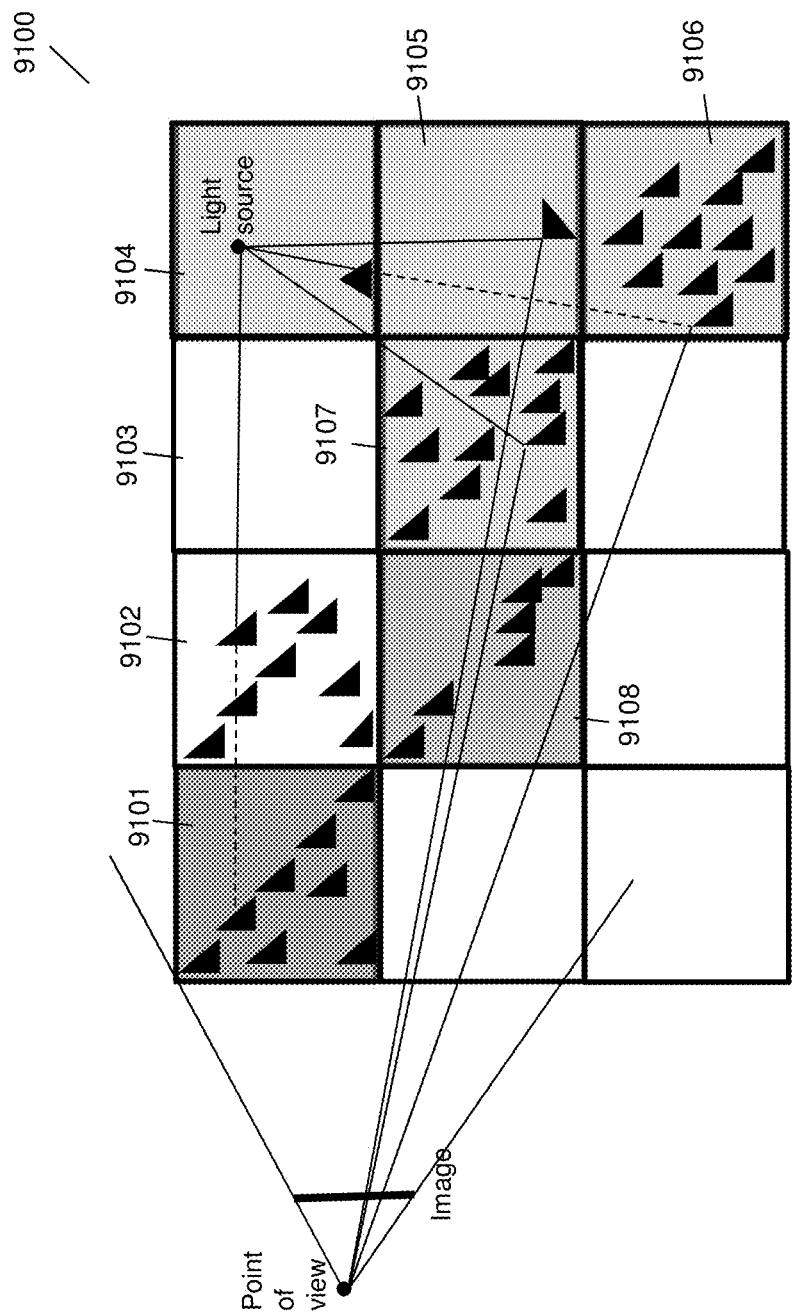
FIG. 9A. An example of subdivision of cells into modules according to a pre-calculated load.

An example of subdivision of cells into modules according to the pre-calculated load is shown in FIG. 9A. A ray tracing system has 12 non-uniformly populated cells and 3 processors for parallel processing. The darkness level of gray cells reflects the pre-calculated shooting load at each cell. The load level by no way is correlated with the number of local objects, as cells 9101 and 9102 have the same number of local objects, however 9101 has the most shooting load, while the cell 9102 has no shooting at all, being obstructed from the point of view by its neighbor's objects. On the other hand, cell 9101 has little shadowing, being completely shadowed by the objects of 9102. Cell 9107 is processed for shooting only moderately, visible via the aperture of 9108, but its shadowing load is high due to multiple local intersection tests. One possible modular division in a system of 4 processors, gaining a fare load balance, is by assigning first processor to cell 9101, second processor to cells 9108, third processor to cell 9104 and 9107, and forth processor to cells 9106 and 9105.

Figure 9B:
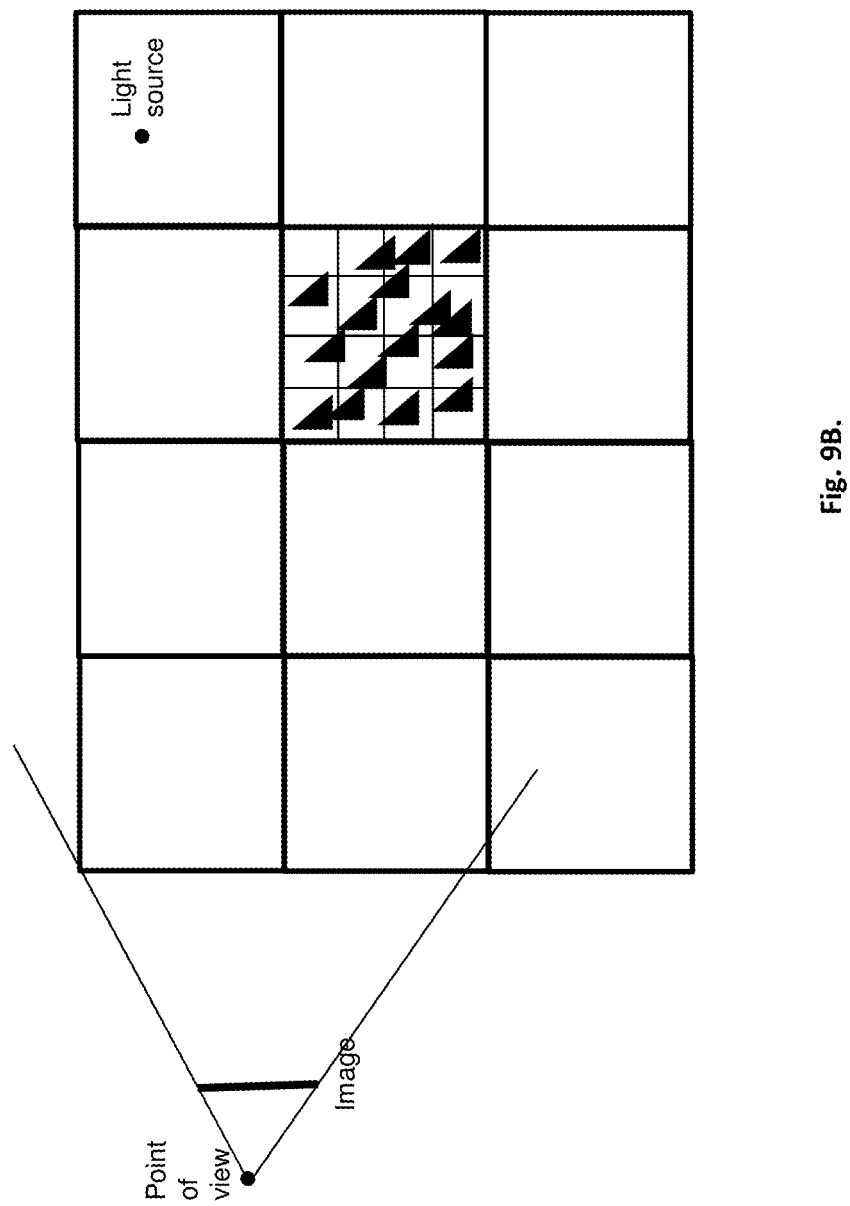
FIG. 9B. An extremely imbalanced case of Rabbit in a stadium.

An extremely imbalanced case is shown in FIG. 9B. It is known as 'rabbit in the stadium', when the entire data is clustered in a small part of the scene space. Such a situation is readily revealed in advance in the pre-processing stage, and corrected by constructing a fine grained subdivision of the populated subspace only, and then assembling modules of these sub-cells.

Secondary Stage.

Figure 2:
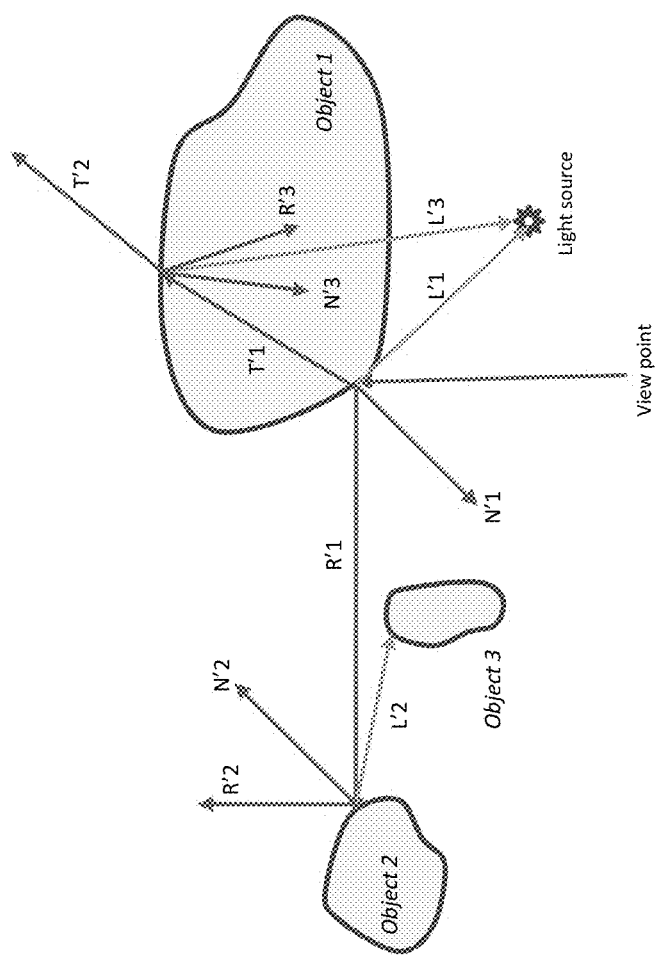
FIG. 2. Prior art. Another setup of a ray traveling across the scene is shown, having three objects and single light source. Three ray generations are created when the primary ray spawns other rays. Terms include N' surface normal, R' reflected ray, L' shadow ray, T' transmitted (refracted) ray.

If the primary ray hits an object, the light may bounce from the surface of the object. These rays are called secondary rays. For example, for a shiny surface, a reflected ray must be calculated. The refracted ray should be considered if the ray hits a transparent or semi-transparent object. To add the shadow effect, a shadow ray must be considered as well. In FIG. 1 two secondary rays are depicted, a reflected ray and a refracted ray. See also rays R'1 and T'1 in FIG. 2.

Our secondary stage is based on data-parallel approach as well, utilizing the same regular grid of cells as of the primary stage. The secondary ray shooting starts from the point of intersection (either primary or secondary). The new ray can be shot in any direction, depending on the normal at the point, based on Snail law. The ray mostly leaves the cell for one of the neighboring cells, being registered in a queue buffer of the addressee. The target cell holds an input queue of incoming secondary rays, all waiting for intersection tests with local objects. These incoming rays, generated by other runtime tasks, are the missing part of the static process locality. Process locality is achieved only after having received the incoming rays, so according to definition, this is a dynamic process locality.

For secondary shadowing the shadow stencils, that have been created in the preprocessing stage and used in the primary stage, are used as well. The shadowing process, same as in the primary stage, contributes to process locality, though let's see the overall process locality of the secondary stage. In the secondary stage of our data parallel approach the incoming rays, stored locally in the input queue buffer, must be confronted with the local subset of objects. The ray data are delivered to the cell in its inactive period, prior assigning a processor. The geometry subset of local objects is loaded into processor's cache memory at the launch of the cell's active period. It is assumed that the grid resolution of the entire scene is designed such that the memory footprint for local scene geometry, cell's shadow stencils, local KD-tree (or other accelerating structure) and input queue, would fit within a cache that might normally be provided with a general purpose processor. Now, having all the required data on place for processing a cell, all the conditions for dynamic process locality are fulfilled. The parallel processing load balance of the secondary stage can't be solved the same way of the primary, since the load distribution among cells is not known in advance, as it was in the primary stage. Therefore, the parallelism must be solved in demand driven way, where the work flow is controlled for optimal load balance, dynamically assigning cells to processors.

The demand driven mode of the secondary stage is based on the same subdivision of space into regular grid of cells, however, whereas in the primary stage those cells were arranged in modules, in secondary stage each cell is treated individually as part of 'soup of cells'. Each processor then processes a cell at a time, until the cell's input queue of rays is exhausted. Whenever a processor finalizes a cell, it turns for demanding a new cell. In terms of parallel processing, this is a demand driven approach of data parallel space subdivision. Although the distribution of cells among processors creates a managing overhead, however only a little processing is required to assign cells to processors. In shared memory systems the inter cell communication of secondary rays is solved by memory access in non-active time of the receiver. In distributed memory systems this communication must be physically performed. Anyway, at the time the receiving cell turns active, all the required data for solving secondary ray tracing at each cell is in place and it is local (object data, stencils, input-queue ray data, accelerating structure, and output-recomposition data). Therefore, this algorithm falls in the class of embarrassingly parallel algorithms.

Figure 10:
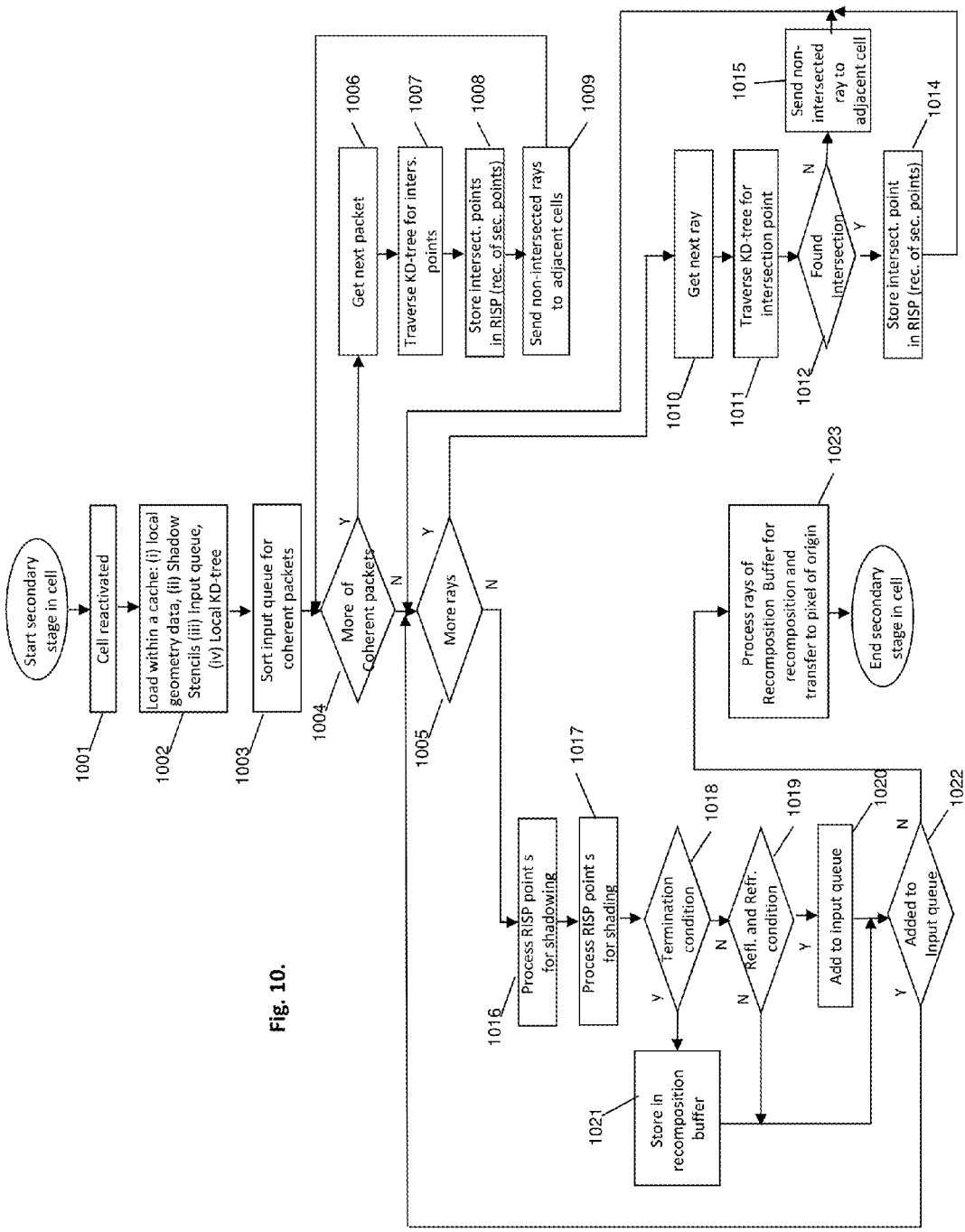
FIG. 10. Flowchart of the secondary stage.

The cell-wise flowchart of the secondary stage of our ray tracing method is shown in FIG. 10. Prior the reactivation 1001, the cell is inactive, meaning that no processor was assigned to the cell, and all the data of incoming secondary rays from other active cells accumulates in the memory in an Input Queue assigned to the cell. All Input Queues are accessible to all processors. Upon assigning a processor to the cell, the cell switches to active mode, and all the required local data is brought 1002 into the cache memory that is associated with the reactivated cell: local geometry data, cell's shadow stencils, input queue, and local KD-tree. According to one basic embodiment the rays in the input queue are taken one by one for KD-tree traversal and for other secondary processing.

Another embodiment calls for tracing the input queue rays in coherent packets. Packet tracing involves tracing a packet of rays having similar origins and directions through a grid. The rays emit from a substantially common grid location and travel in a substantially similar direction, such that most of the rays go through common grid locations. Thus, packet tracing requires identifying clusters of rays in the input queue traveling in a similar direction, from a similar origin. Residual rays that cannot be matched into packets are traced individually. The packet based embodiment is built in FIG. 10. The same flowchart can easily apply to a non packeted rays, if the packet is just replaced by a single ray. The input queue is sorted 1003 for packets. For each packet the local KD-tree is traversed 1007 seeking for points of intersection. All points of intersection are stored 1008 in RISP (record of intersected secondary points. Non intersected rays are sent out 1009 to further cells. When all packets are exhausted, the turn of individual cells to be traced. A ray is taken to traverse 1011 the local KD-tree. If found, the intersection is stored 1014 in RISP, otherwise the ray is sent 1015 to adjacent cell. When all rays of the input queue are exhausted, all RISP points are processed for shadowing 1016, and for shading 1017. Then rays are tested for termination condition 1018, and if found positive, a ray is stored in recomposition buffer 1021, for a later transit back to the pixel of origin. Otherwise the ray is tested for reflection or retraction 1019, while in both events at least one new ray joins the input queue 1020. In such a case the new rays are subjects to anew ray tracing sequence. Otherwise, the recomposition buffer of rays is processed for recomposition 1023 and rays are sent back on the way to their pixel of origin.

Runtime Workflow

The two runtime stages of present invention, primary and secondary, are both data-parallel, however they are treated by two different load balancing strategies. In the primary stage, thanks to static processing locality, the cells are allocated to processors by groups of modules. This allocation lasts throughout the entire stage. Whereas in the secondary stage, due to lack of static locality, but having dynamic processing locality instead, there is no grouping of cells in modules, nor permanent allocation of cells to processors, but the cells are taken for processing in a demand driven fashion. Within each stage, and particularly in the transition between these two stages, the utilization of processing resources (such as processors and cache memories) is kept maximal, while the idle times are kept minimal. This will become evident from the following description of the workflow.

The primary stage consists of a series of sub-stages. Those sub-stages play fluently with no idle times and with a smooth transition between the primary and secondary stages. A maximal utilization of processing resources is achieved. The data used in each cell during the primary stage comprises local object data, local KD-tree, and local stencils. The cache memory size would be preferably fit to this data, for maximal cache utilization. Lists of light sources and empty cells are available globally.

1. Primary ray shooting. All local rays are generated and tested for hitting the stencil-out. Rays that missed the shooting stencil are dropped. Rays that hit shooting stencil are checked for intersection with local objects, by way of a local KD-tree. Each tested ray is a definite candidate for hitting and object, thus the number of local hits equals to the number of tested rays. All intersection points are stored in RIPP (record of intersected primary points).

2. Shadowing. All RIPP points must be tested for shadowing. First, for all light sources, each RIPP point is tested for hitting the shadow stencil by shooting a ray in the light source direction. If a hit is recognized, the point is shadowed. If no hit, the RIPP point is checked for intersection with relevant local objects vs. each of the light sources, by means of KD-tree. Points having intersection are shaded. All the points that survived the shadowing tests are illuminated.

The transit to secondary stage is smooth, eliminating idle times between the primary and secondary stage. At each cell, upon completing the shadowing, the RIPP points are shaded. Shaded points are checked for secondary according to surface characteristics. Points checked for secondary are collected in record of secondary points (RSP). These points are processed first for local points of refraction and reflection, as a transition to the secondary stage. This processing includes intersections with local objects and emitting rays to the input queue of adjacent cells. Upon transition completed, the cell is released to the Demand Driven mechanism for the secondary stage, and the processor switches to next cell in the module. Each processor processes all its module's cells, one by one. Thus when a cell passes to secondary stage, the processor is still engaged with remaining cells of its module as a primary stage.

The secondary stage takes a demand driven approach. There are no modules, each cell is treated individually as part of 'soup of cells'. Each processor is allocated a cell at a time. Upon termination, another cell is supplied.

3. A cell that has completed primary stage joins the pool of cells for the secondary stage. During its inactive state, waiting to be 'demanded', its input queue buffer remains available in the memory for incoming rays from other cells.

4. A processor, upon completing all its allocated cells of the primary stage, counts in to the Demand Driven working force. It is instantly allocated the next available cell for secondary processing. There is no idle transition time.

5. When a cell becomes active (taken by a processor) all incoming rays gathered in its input queue buffer are tested for intersection with local objects. If no hit, they are sent to the next cell. If intersected, they are treated for refraction and retraction. If reached terminal condition, they are treated for texturing and recomposition with all previous intersection points on the way back to the screen. Speeding up the traversal of local KD-tree can be done by presorting the queued rays into coherent packets: rays that have nearly the same origin and nearly the same direction are likely to trace out similar paths. The data used at each cell during secondary stage comprises local object data, local KD-tree, local shadow stencils and ray input queue. The cache memory size should match the size of this data, for maximal cache utilization. Lists of light sources and empty cells are available centrally.

Figure 11:
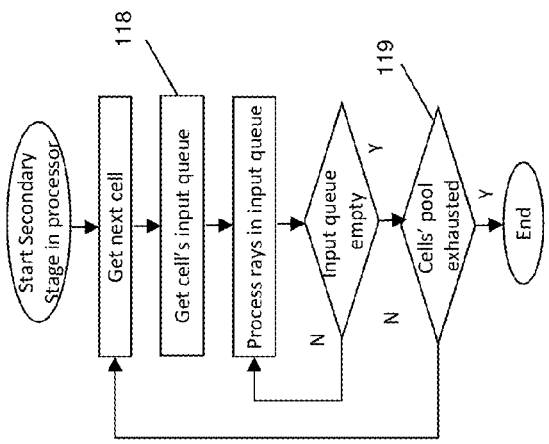
FIG. 11. A runtime workflow in a processor.
Figure 11:
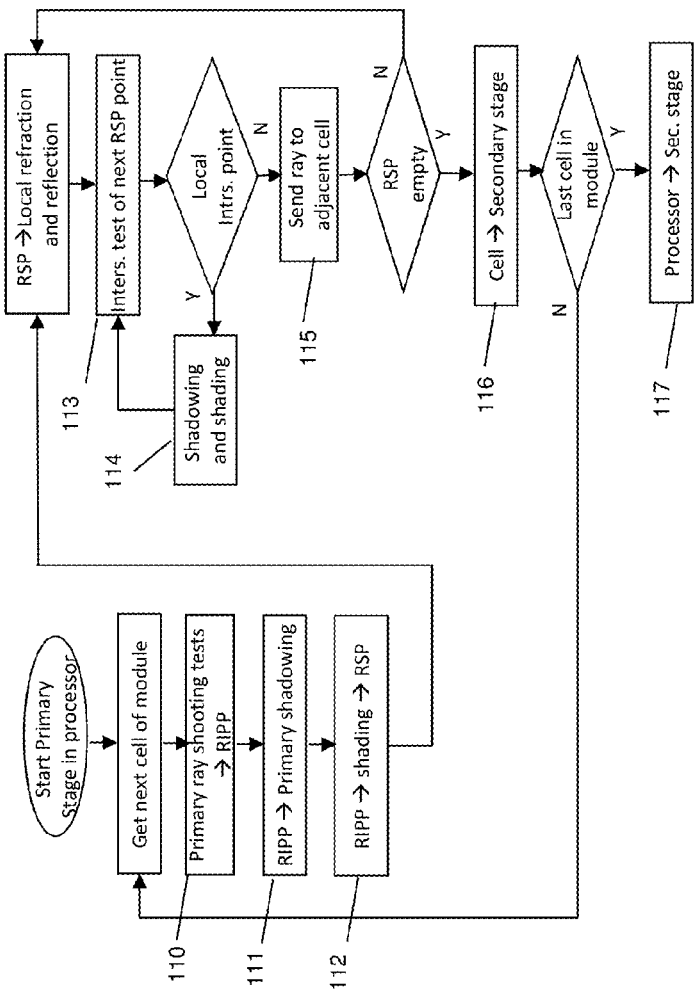

The smooth transitioning between the primary and secondary stages is illustrated in FIG. 11, a schematic flowchart of runtime workflow in a single processor: (a) primary stage in a single data filled cell, (b) transition to secondary stage, and (c) secondary stage. A cell taken once by a processor in the primary stage is fully worked out for primary stage and for local secondary stage which is a transition to full secondary stage. Two different approaches of parallelism are taken. During the primary stage a processor is allocated a module of cells for the entire stage, whereas in the secondary stage there is no permanent association between processors and cells. All cells are rather located in a single pool of cells, picked up on demand by next available processor. In column (a) a schematic description of primary stage is shown, where cells are grouped in modules and each processor works out its module's cells one by one. The primary shooting 110 generates points of primary intersection which are stored in RIPP, shadowed 111, and shaded 112. The primary shadowed points having reflecting and/or refracting characteristics are stored in RSP (record of secondary points), and are taken to transition phase. (b) The transition phase comprises the first secondary pass applied on local rays only in each cell, no input rays from other cells. The local secondary rays are processed for retraction and reflection, for intersection tests with local objects 113, and whenever applicable, for shadowing and shading 114. Rays that leave the cell are stored in adjacent cell's input queue which resides in main memory, approachable to all. When the first pass of all local secondary rays in a cell is completed, the cell is moved to secondary stage 116, joining the secondary 'soup of cells'. The processor picks up the next cell in the module. The processor moves to the secondary stage 117 only when all its module's cells left for full secondary stage. (c) Then the processor joins the pool of on-demand processing resources. It is allocated next cell for secondary processing, downloads cell's input queue 118, and processes the cell for secondary stage. The processor and its fellow processors are fed cells from 'soup of cells' pool until the secondary stage is exhausted 119. The fact that not all processors switch at the same time to the second stage works well due to flexibility of the transition phase; all processors are at full utilization all the time, and the overall processing load is well balanced.

Figure 12A:
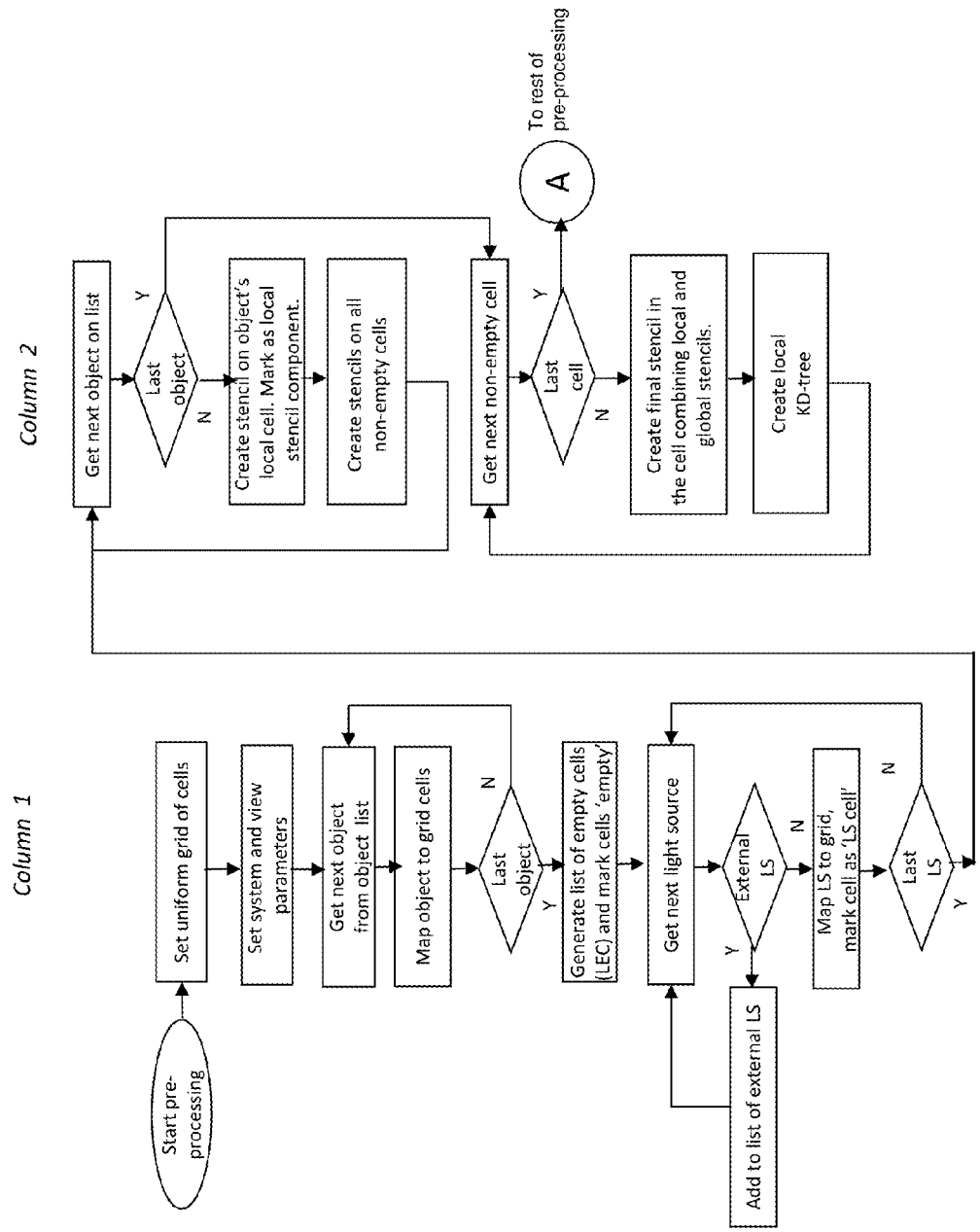
FIG. 12A. Flowchart of preprocessing: setup and generation of shooting stencils.
Figure 12B:
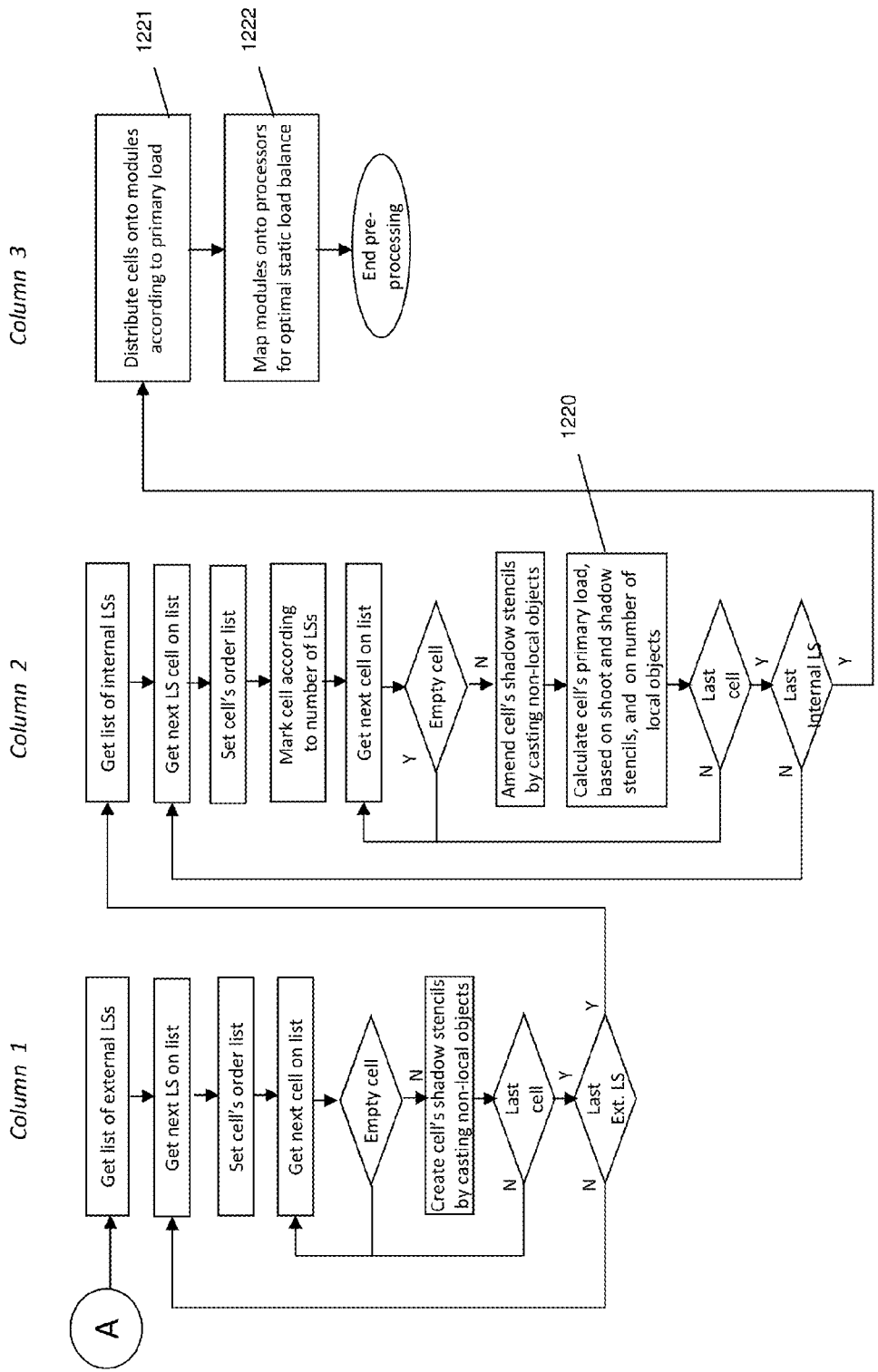
FIG. 12B. Continued flowchart of pre-processing: generation of shadow stencils and setup of static load balance.

The comprehensive preprocessing flowchart is shown in FIGS. 12A and 12B. It repeats on the tasks of system setup and generation of shooting stencils, described before in FIG. 18, as well as generation of shadow stencils, described before in FIG. 25. The tasks of precomputation of the primary load, and modular division of cells are shown anew. Column 1 of FIG. 12A describes the setup, including creation of grid based data structure, mapping objects to cells, and compiling a list of empty cells and light sources. Column 2 of FIG. 12A describes generation at all non empty cells: (i) shooting stencils, and (ii) accelerating data structure, i.e. KD-tree. Column 1 of FIG. 12B describes the generating of shadow stencils per each external light source from a list, at all data filled cells, by casting non-local objects for each data filled cell. Column 2 of FIG. 12B describes amending of shadow stencils per each internal in-scene light source from a list, at all data filled cells, by casting non-local objects for each data filled cell. In block 1220 cell's primary load is calculated, based on surface area of the shooting and shadow stencils, and on the number of local objects, as described hereinbefore. Blocks 1221 and 1222 of column 3, respectively, describe distributing cells to modules according to their primary load and mapping those modules to processing resources for optimal load balancing.

It is noteworthy to state that while the preprocessing stage in a whole repeats every frame, the task of generating shadow stencils is performed only upon changes in the scene and in light sources. When a camera (POV) moves in and out or around the scene, without real modification of the scene, the generation of shadow stencil is saved from preprocessing. The cost of generating shadow stencils is high and depends very much on the number of light sources, so when multiple light sources are present in the scene, the saved preprocessing time may be significant. In prior art animated scenes present a challenge due to the high cost of rebuilding a kd-tree as the objects or the POV move. Building the acceleration structure effectively requires seconds to minutes for moderately complex scenes. Most algorithms for building kd-trees have a time complexity of O(N log 2 N). E.g. for N=1,000,000, the complexity is O(1,000,000*20)! Kd-trees therefore are unsuitable for most truly dynamic animations that require unstructured motion. For full generality, the acceleration structure must be rebuilt from scratch every frame. For general scenes, with kd-trees this is currently infeasible.

As opposed to prior art, we do not use a global kd-tree. The local kd-trees that we use are small with low time complexity. Although the time complexity of constructing a uniform grid is neglectable, but the complexity of generating stencils is not so. Therefore, a resultant improval of performance by saving the construction time of shadow stencil is significant for running animated scenes.

Implementation Embodiments

Figure 13:
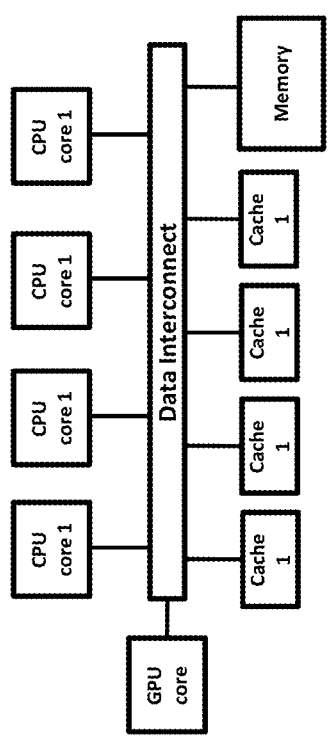
FIG. 13. A schematic description of a shared memory and shared caches multiprocessing architecture.

Our stencil based algorithm can be efficiently implemented on a single processor systems, as well as on multi-processor systems, general purpose processors, special purpose processors, multicore processors, and GPUs. These processors can be integrated in different computing systems such as single processor computing systems, parallel computers, PC-level computers, information server computers, cloud server computers, laptops, portable processing systems, tablets, Smartphones, and other computer-based machines. Although a sequential computing system is capable of performing our shadowing algorithm, however, parallel computing system would do it for larger models. Today, a typical classification by model size is to small models of up to few hundreds of polygons, medium models of up to a few millions of polygons, and large models of up to billions of polygons. Due to our enhanced load balancing, the performance scalability is linear to the number of participating processors. The multiple processors of a parallel system can share a single 'shared' memory, typically for small or medium models, when the model resides in a single memory shared by all processors. For large models the multiple processors of a parallel system would preferable have private memories, so called distributed memory parallel computing systems, when the large model is distributed among the memories, and each processor has a sole access to its private memory. An exemplary schematic description of a shared memory parallel system competent to efficiently run our stencil based algorithm is depicted in FIG. 13. There are four processors, four shared caches, one GPU and one shared memory. In a preprocessing stage the processors run in parallel to distribute the scene objects, to create stencils, to precalculate the primary loads and to create modules of cells for the primary stage. Preferable, the GPU can be utilized for creation stencils, due to the built in efficiency of a graphics pipeline to process a stream of polygons. The number of modules depends on the processing resources. For example, 4 processors can be employed in a multithreading way, 2 threads per processor. In such a case the scene space will be preferable subdivided into 8 modules of cells, for enhanced load balancing. In primary stage the modules are allocated to processors (or to threads). Each processor makes a use of caches and memory to process for visibility and shadowing among its module's cells, as described in details hereinbefore. Each cell is processed in an entirely independent way, generating a complete data of intersected and shadowed points. The primary intersection points of reflectiveness and transparency, become a starting point for secondary rays. Once a primary cell is done, it is moved to the pool of secondary rays. When a processor exhausted all its primary cells, it switches to the demanding mode of work of the secondary stage, serving the pool of cells. When a cell is in its inactive phase, all its private data; stencils, objects, location parameters, intersection points, shadowing results, etc., are kept in the memory. When a cell is assigned a processor and switches to active phase, the private data is downloaded to the cache, serving the cell throughout its activity. Assuming a correct system design, the cache keeps all the required data for cell's activity, reducing possible cache misses.

Figure 14:
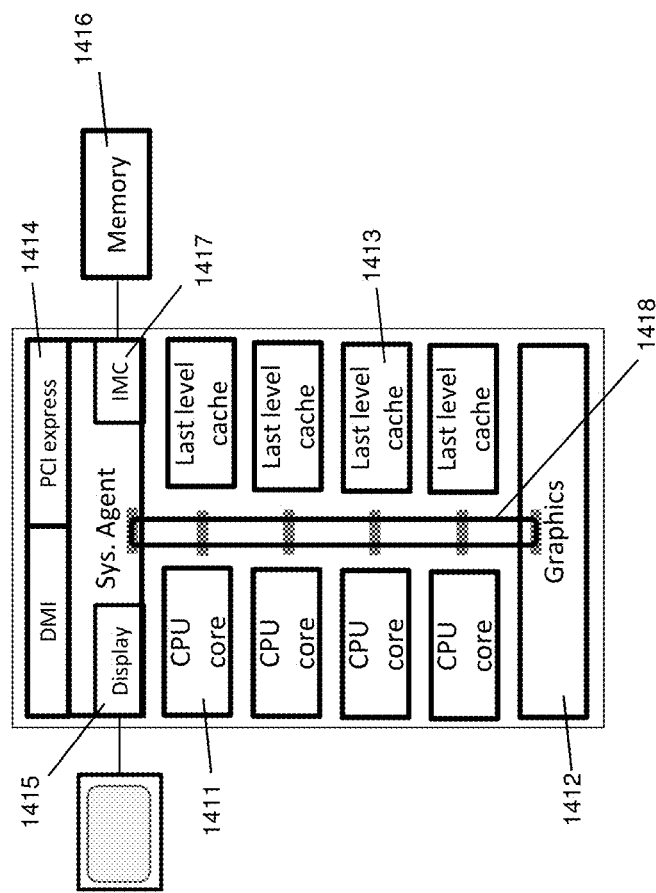
FIG. 14. A prior art multicore architecture.

Commercial parallel systems may offer advantages of lower cost and matured programming environment. One of such systems is a multi-core architecture by Intel, SandyBridge or IvyBridge. SandyBridge, as depicted in FIG. 14, comprises multiple CPU cores 1411, multiple cache memories 1413, pipeline-graphics core (one or more) 1412, ring type data interconnection 1418, display interface 1415, and PCI express interface 1414. This is a shared memory parallel system, with no private memories, integrated with SOC (system on chip) technology (termed also 'multicore'), where the entire system resides on a single chip, and silicon constraints exclude constructing private memories on the chip. Therefore the main memory 1416 is external to the SOC and connected by an integrated memory controller IMC 1417.

Figure 15B:
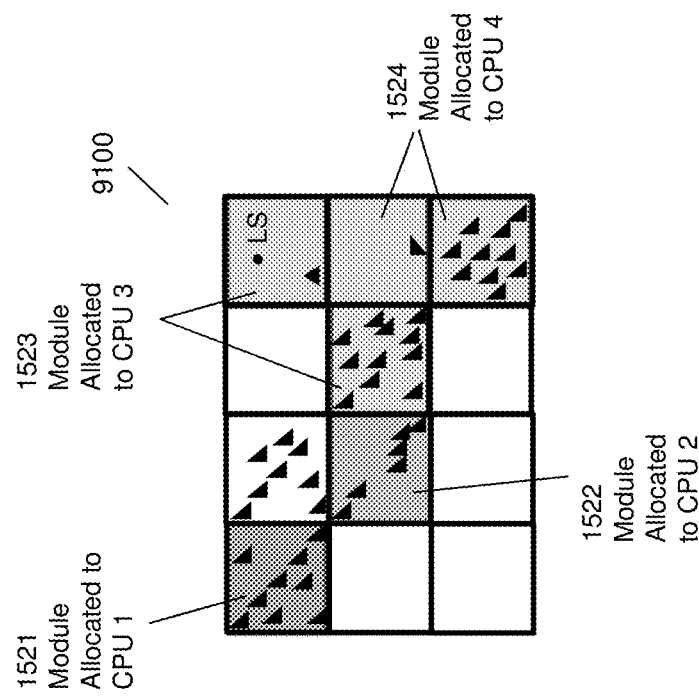
FIG. 15B. An example of mapping a multicore processing resources onto cell modules according to processing load.
Figure 15A:
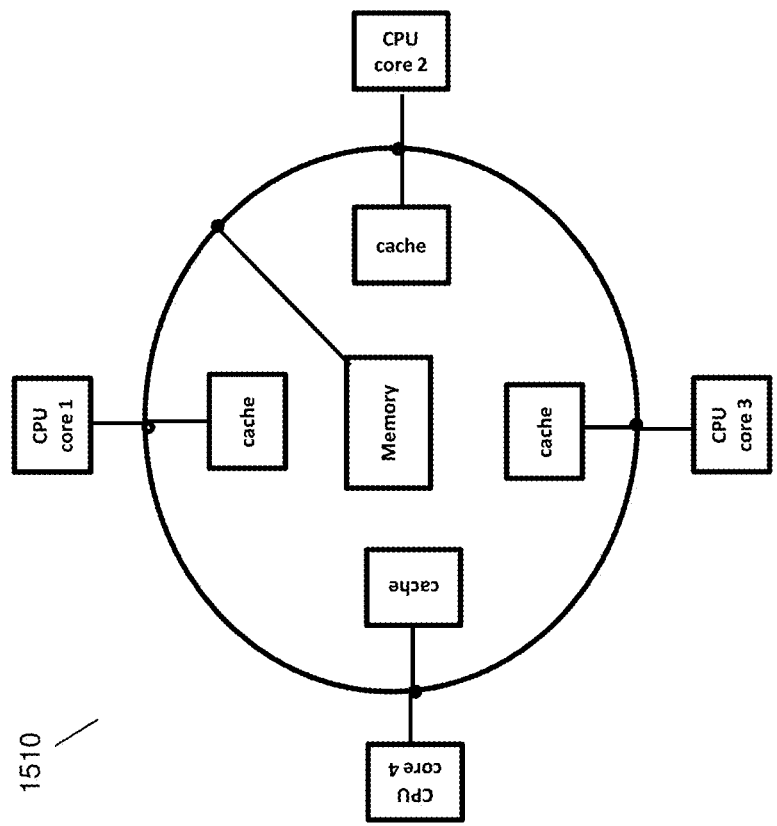
FIG. 15A. A schematic description of multicore based implementation.

An example of efficient implementation of our stencil based algorithm on a multicore system is shown in FIG. 15A. The simplified schematic description includes four CPU cores, four shared caches, data ring interconnection, and shared memory. The graphics module 1412 of the multicore is not shown, but it can be utilized for some parts of our stencil based algorithm, such as shading, texturing, stencil generation, etc. FIG. 15B depicts an allocation example of the cell modules of FIG. 9A onto the CPU cores of the multicore described. In this example threads are not utilized. Four modules are shown. Two modules 1521 and 1522, having one cell each, are allocated to processors 1 and 2, respectively. The two other modules, 1523 and 1524, having two cells each, are allocated to processors 3 and 4, respectively.

Figure 16:
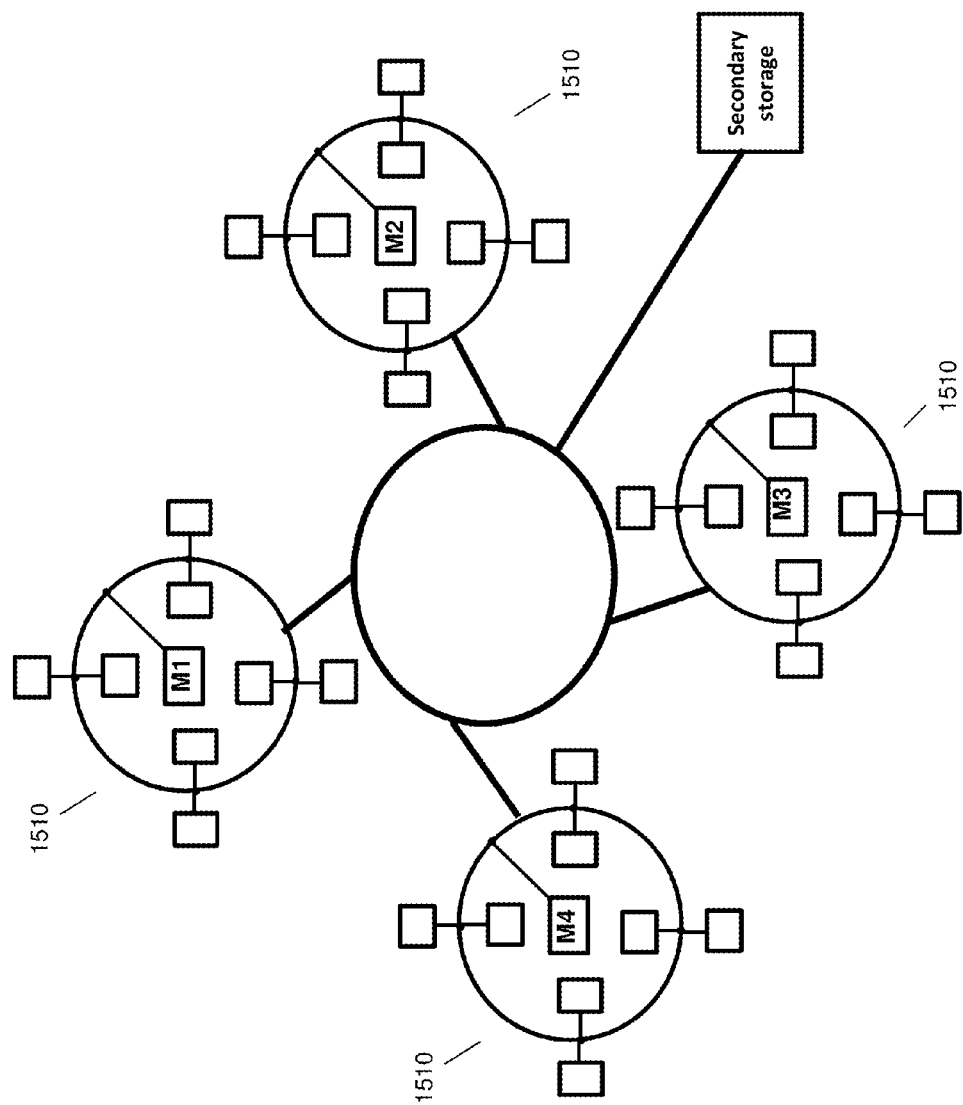
FIG. 16. Schematic description of a distributed memory ray tracing architecture built of multicores.

If very large models need to be rendered, the processing, storage and cache requirements as well as memory bandwidth will increase in accordance. It may then become inefficient to run our parallel algorithm on a single multicore system efficiently. Therefore for large models a distributed memory parallel system would be more suitable. FIG. 16 shows a non-binding schematic example of a distributed memory ray tracing system built of Multicores. There are four Multicores interconnected by a ring, each multicore has a private memory for its exclusive use, and all are connected to secondary storage by means of the ring. The external ring interconnect is of course much slower than the on-chip integrated interconnection of a multicore. This causes a disadvantage in the secondary demand driven stage, due to intensive intercell communication of secondary rays. Fortunately enough, the primary stage lacks inter cell communication, so there is no communication along the central ring during the primary stage. The use of the external ring starts only when the core processors start to transit from primary to secondary stage.

Figure 17:
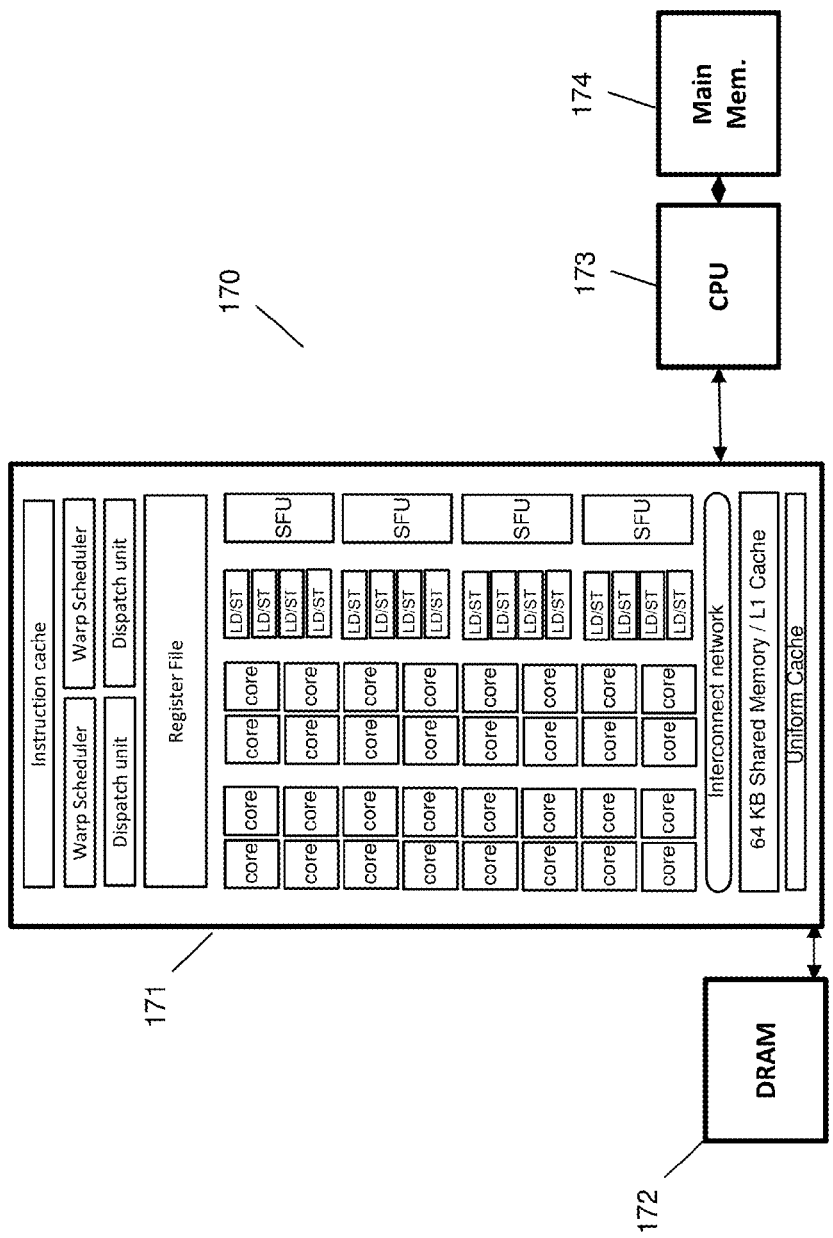
FIG. 17. GPU implementation.

Another example of an efficient implementation of our stencil based ray tracing is the GPU. In recent years the GPU has evolved into a processor with unprecedented floating-point performance and programmability; today's GPUs greatly outpace CPUs in arithmetic throughput and memory bandwidth, making them a good match to accelerate a variety of data parallel applications. The modern discrete GPUs have hundreds of processing units called 'shaders' matching the embarrassingly parallel task of running thousands of cells of our stencil based ray tracing. FIG. 17 shows an example of a GPU system 170 based on Fermi GPU 171, with video memory (DRAM) 172, a monitoring host CPU 173, and main memory 174. The processing at the cell level is done by threads. The local cell data to a thread is provided by the memory hierarchy of L1 cache, L2 cache and DRAM. For the primary stage the shaders are assigned to modules according to a preprocessing load balancing considerations. In the secondary stage the interconnect network is used to deliver the secondary rays to their cell destination.

Figure 18:
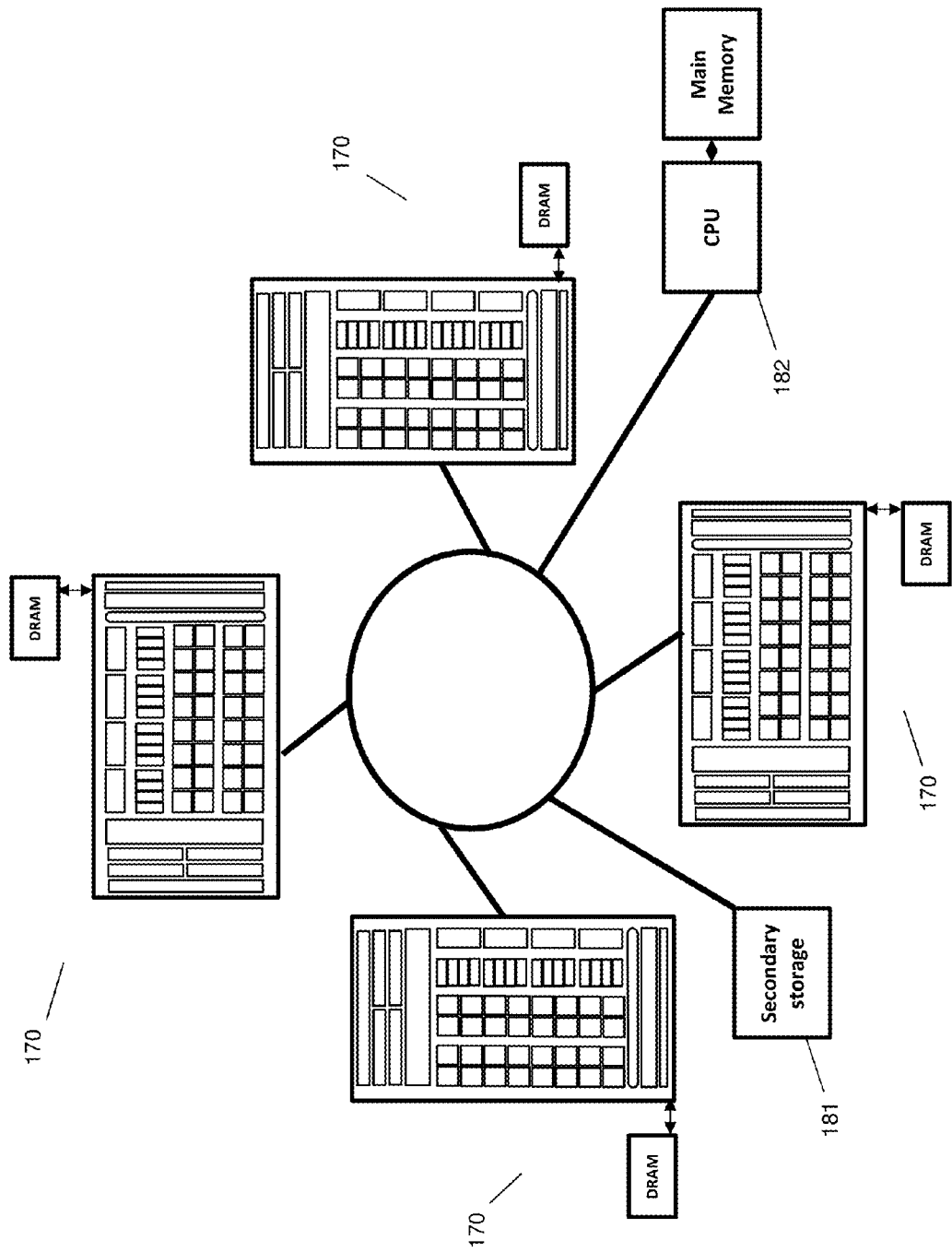
FIG. 18. Implementation on a distributed memory ray tracing architecture built of GPUs.

If very large models need to be rendered, the processing, storage and cache requirements as well as memory bandwidth will increase in accordance. It may then become inefficient to run our parallel algorithm on a single GPU system. Therefore for large models a distributed memory parallel system would be more suitable. FIG. 18 shows a non-binding schematic example of a distributed memory ray tracing system built of GPUs. There are four GPUs 170 interconnected by a ring, each GPU has a private DRAM memory, and all are connected to secondary storage 181 by means of ring. The host CPU 182 is connected to the ring as well.

What is claimed is:
1. A ray tracing method in a computer graphics system, having stencil based primary ray shooting, implemented on cells, comprising the steps of:
   a preprocessing computing phase;
      generating a data structure of cells wherein each cell represents a volumetric area by spatially dividing a 3D scene, wherein cell is a basic unit of processing and data locality;
      distributing objects of the 3D scene into said cells based upon their location in the scene;
      creating two dimensional shooting stencils cache data filled cells containing scene objects, wherein said shooting stencils cache data to enable locality of processing at each cell;
      wherein the shooting stencils are a projection of 3D scene objects cast onto the facets of the volumetric areas of the cells;
   a runtime computing phase;
      in all cells having a shooting stencil, creating local segments of only those shooting primary rays that hit the shooting stencil by accessing said cache data;
      in all cells having a shooting stencil, creating local segment of a shooting primary ray, finding a point of intersection between the local segment of a shooting ray and one of a plurality of objects located in a given cell being tested for intersection.

2. The method of claim 1, wherein said data structure of cells comprises uniform grid of cells.

3. The method of claim 2, wherein said grid of cells is generated in a preprocessing stage.

4. The method of claim 1, wherein said shooting stencils are generated in a preprocessing stage.

5. The method of claim 1, wherein said local segments of a shooting ray can be processed for intersection In any arbitrary order.

6. The method of claim 1, wherein said shooting stencils are a 2D projection of objects, cast on cell facets.

7. The method of claim 1, wherein each shooting ray comprises multiple segments, and each segment Is processed in a cell independently of segments in other cells.

8. The method of claim 1, wherein the method is implemented on any computational-based machine selected from the group consisting of a PC-level computer, information server computer, cloud server computer, parallel computer, laptop, portable processing system, tablet, and smartphone.

9. The method of claim 1, wherein the shooting workload in a cell can be pre-calculated based on the surface area of the shooting stencil.

10. The method of claim 1, wherein the cells of a grid are processed in any arbitrary order for primary ray shooting.

* * * * *